US011215911B2

(12) United States Patent
Obinata et al.

(10) Patent No.: US 11,215,911 B2
(45) Date of Patent: Jan. 4, 2022

(54) LIGHT SOURCE DEVICE AND PROJECTION-TYPE DISPLAY APPARATUS

(71) Applicant: SONY CORPORATION, Tokyo (JP)

(72) Inventors: Mariko Obinata, Kanagawa (JP); Izushi Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/961,336

(22) PCT Filed: Jan. 8, 2019

(86) PCT No.: PCT/JP2019/000213
§ 371 (c)(1),
(2) Date: Jul. 10, 2020

(87) PCT Pub. No.: WO2019/142698
PCT Pub. Date: Jul. 25, 2019

(65) Prior Publication Data
US 2020/0371416 A1 Nov. 26, 2020

(30) Foreign Application Priority Data
Jan. 19, 2018 (JP) .............................. JP2018-007191

(51) Int. Cl.
*G03B 21/20* (2006.01)
(52) U.S. Cl.
CPC ......... *G03B 21/204* (2013.01); *G03B 21/208* (2013.01)
(58) Field of Classification Search
CPC ........................... G03B 21/204; G03B 21/208
See application file for complete search history.

(56) References Cited

U.S. PATENT DOCUMENTS

| 2011/0149549 A1* | 6/2011 | Miyake ............... F21V 9/32 362/84 |
| 2011/0310362 A1* | 12/2011 | Komatsu ............. F21V 7/00 353/85 |

(Continued)

FOREIGN PATENT DOCUMENTS

| CN | 102645830 | 8/2012 |
| CN | 104570567 | 4/2015 |

(Continued)

OTHER PUBLICATIONS

International Search Report prepared by the Japan Patent Office dated Apr. 2, 2019, for International Application No. PCT/JP2019/000213.

(Continued)

*Primary Examiner* — Rajarshi Chakraborty
*Assistant Examiner* — Nathaniel J Lee
(74) *Attorney, Agent, or Firm* — Sheridan Ross P.C.

(57) ABSTRACT

A light source device according to an embodiment of the present disclosure includes: a light source section including a first light source outputting light in a first wavelength range and a second light source outputting light in a second wavelength range in a same direction as the light in the first wavelength range; a wavelength converter that is excited by the light in the first wavelength range to output fluorescent light; a light condenser that concentrates the light in the first wavelength range and the light in the second wavelength range on the wavelength converter; and a multiplexer that transmits light in the first wavelength range and that reflects at least a portion of the light in the second wavelength range in accordance with incident angles of the light, and combines the light in the first wavelength range, the light in the second wavelength range, and the fluorescent light.

20 Claims, 34 Drawing Sheets

(56) References Cited

U.S. PATENT DOCUMENTS

| | | | |
|---|---|---|---|
| 2012/0021180 A1 | 1/2012 | Miyake et al. | |
| 2014/0340649 A1 | 11/2014 | Takahashi et al. | |
| 2015/0109583 A1* | 4/2015 | Inoko | G03B 21/204 |
| | | | 353/30 |
| 2016/0026076 A1 | 1/2016 | Hu | |
| 2016/0377967 A1* | 12/2016 | Ando | B32B 7/12 |
| | | | 362/84 |
| 2016/0377976 A1 | 12/2016 | Miyake et al. | |

FOREIGN PATENT DOCUMENTS

| | | |
|---|---|---|
| CN | 105659161 | 6/2016 |
| EP | 2966502 | 1/2016 |
| JP | 2012-009242 | 1/2012 |
| JP | 2012-123180 | 6/2012 |
| JP | 2012-128340 | 7/2012 |
| JP | 2015-219321 | 12/2015 |
| JP | 2016-071258 | 5/2016 |
| JP | 2016-122160 | 7/2016 |

OTHER PUBLICATIONS

Official Action for China Patent Application No. 201980008171.X, dated Jun. 3, 2021, 13 pages.

\* cited by examiner

US 11,215,911 B2

LIGHT SOURCE DEVICE AND PROJECTION-TYPE DISPLAY APPARATUS

CROSS REFERENCE TO RELATED APPLICATIONS

This application is a national stage application under 35 U.S.C. 371 and claims the benefit of PCT Application No. PCT/JP2019/000213 having an international filing date of 8 Jan. 2019, which designated the United States, which PCT application claimed the benefit of Japanese Patent Application No. 2018-007191 filed 19 Jan. 2018, the entire disclosures of each of which are incorporated herein by reference.

TECHNICAL FIELD

The present disclosure relates to a light source device including, for example, a fluorescent light body wheel, and a projection-type display apparatus including the light source device.

BACKGROUND ART

In recent years, a light source device using, for example, a laser diode (LD) and a fluorescent light body has been developed for a projection-type display apparatus (projector). A light source device for a projector uses a system in which a Ce-YAG (cerium:yttrium-aluminum-garnet) fluorescent light body is excited to output fluorescent light and red light and green light are obtained from the fluorescent light. However, a color gamut in this system is as narrow as about 60% in the BT2020 standard. In addition, in a case where display is performed using D65 that is defined as a white point in the sRGB standard, a red light component of fluorescent light is rate-limiting.

In contrast, for example, PTL 1 discloses a light source device in which balance of three reduced colors is improved by adding a laser that outputs light in a red wavelength range in an optical path aside from a laser in a blue wavelength range that is a light source for excitation of a fluorescent light body.

CITATION LIST

Patent Literature

PTL 1: Japanese Unexamined Patent Application Publication No. 2014-186115

SUMMARY OF THE INVENTION

Incidentally, in projectors, expansion of a color gamut is desired.

It is desirable to provide a light source device and a projection-type display apparatus that are able to expand a color gamut.

A light source device according to an embodiment of the present disclosure includes: a light source section including a first light source outputting light in a first wavelength range and a second light source outputting light in a second wavelength range in a same direction as the light in the first wavelength range, the second wavelength range being different from the first wavelength range; a wavelength converter that is excited by the light in the first wavelength range to output fluorescent light; a light condenser that concentrates the light in the first wavelength range and the light in the second wavelength range on the wavelength converter; and a multiplexer that has wavelength selectivity in which the light in the first wavelength range is transmitted and at least a portion of the light in the second wavelength range is reflected or transmitted in accordance with incident angles of the light in the first wavelength range and the light in the second wavelength range, and combines the light in the first wavelength range, the light in the second wavelength range, and the fluorescent light.

A projection-type display apparatus according to an embodiment of the present disclosure includes: a light source device; an optical modulator that modulates light outputted from the light source device; and a projection optical system that projects the light from the optical modulator. The light source device included in this projection-type display apparatus includes the same components as those of the light source device according to the embodiment of the present disclosure described above.

The light source device according to the embodiment and the projection-type display apparatus according to the embodiment of the present disclosure includes the light condenser and the multiplexer. The light condenser concentrates the light in the first wavelength range and the light in the second wavelength range on the wavelength converter, and the multiplexer has wavelength selectivity in which the light in the first wavelength range is transmitted and at least a portion of the light in the second wavelength range is reflected or transmitted in accordance with the incident angles of the light in the first wavelength range and the light in the second wavelength range, and combines the light in the first wavelength range, the light in the second wavelength range, and the fluorescent light obtained by conversion in the wavelength converter. This makes it possible to improve use efficiency of the light in the first wavelength range, the light in the second wavelength range, and the fluorescent light.

According to the light source device according to the embodiment and the projection-type display apparatus according to the embodiment of the present disclosure, the light condenser and the multiplexer are provided. The light condenser concentrates the light in the first wavelength range and the light in the second wavelength range on the wavelength converter, and the multiplexer has wavelength selectivity in which the light in the first wavelength range is transmitted and at least a portion of the light in the second wavelength range is reflected or transmitted in accordance with the incident angles of the light in the first wavelength range and the light in the second wavelength range, and combines the light in the first wavelength range, the light in the second wavelength range, and the fluorescent light obtained by conversion in the wavelength converter. This makes it possible to improve use efficiency of the light in the first wavelength range, the light in the second wavelength range, and the fluorescent light. Accordingly, it is possible to expand a color gamut of light outputted from the light source device.

It should be noted that the effects described here are not necessarily limited, but any of effects described in the present disclosure may be included.

MODES FOR CARRYING OUT THE INVENTION

The following describes embodiments of the present disclosure in detail with reference to the drawings. The following description is a specific example of the present disclosure, but the present disclosure is not limited to the following embodiments. Moreover, the present disclosure does not limit the disposition, dimensions, dimension ratios, and the like of respective components illustrated in the respective drawings. It should be noted that description is given in the following order.
1. First Embodiment (Light source device including a light-condensing lens and a dichroic film between a light source section and a reflective fluorescent light body wheel)
1-1. Configuration of Light Source Device
1-2. Configuration of Projector
1-3. Workings and Effects
2. Second Embodiment (Light source device including a light-condensing lens and a dichroic film between a light source section and a transmissive fluorescent light body wheel)
2-1. Configuration of Light Source Device
2-2. Workings and Effects
3. Modification Examples
3-1. Modification Example 1 (Example in which a red light reflection region is provided only at a predetermined position)
3-2. Modification Example 2 (Example using position characteristics of a dichroic film)
3-3. Modification Example 3 (Example in which a red light reflection region is provided in a time-divisional manner)

1. First Embodiment

Figure 1:
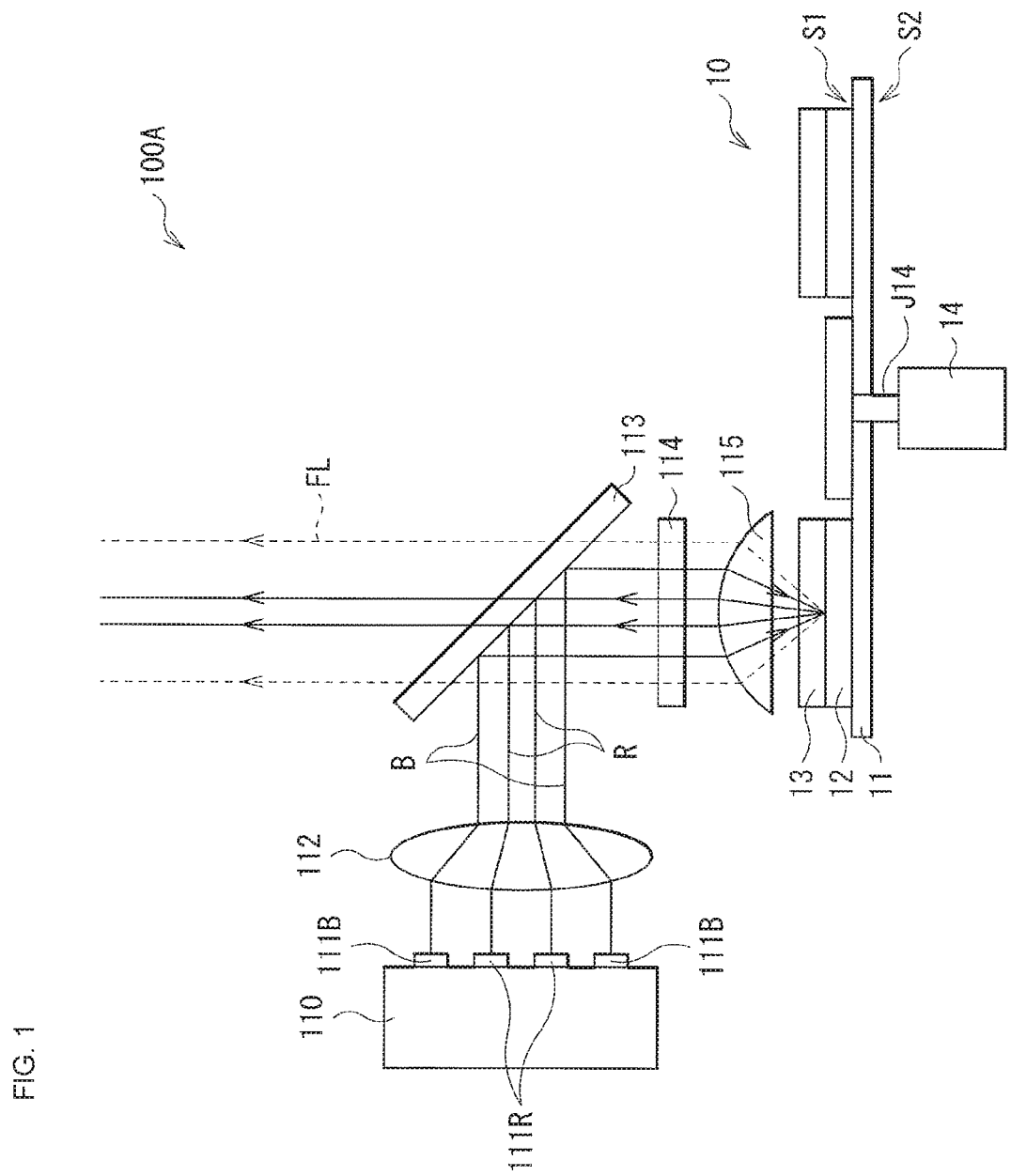
FIG. 1 is a schematic diagram illustrating an example of a configuration of a light source device according to a first embodiment of the present disclosure.

FIG. 1 schematically illustrates an example of a configuration of a light source device (light source device 100A) according to a first embodiment of the present disclosure. The light source device 100 is used, for example, as alight source device 100 of a projection-type display apparatus (projector 1) to be described later (see FIG. 13). The light source device 100A according to the present embodiment has a configuration in which a light-condensing lens 115 (light condenser) and a dichroic film 13 (multiplexer) are disposed between a light source section 110 and a fluorescent light body wheel 10 (wavelength converter).

1-1. Configuration of Light Source Device

The light source device 100A includes the light source section 110, a lens 112, a dichroic mirror 113, the light-condensing lens 115, and the fluorescent light body wheel 10. The fluorescent light body wheel 10 is, for example, a reflective wavelength conversion element, and is rotatably supported by a shaft J14. Respective members included in the light source device 100A are disposed in an optical path of light outputted from the light source section 110 in order of the lens 112, the dichroic mirror 113, a λ/4 wave plate 114, the light-condensing lens 115, and the fluorescent light body wheel 10.

The light source section 110 includes, as light sources, solid-state light-emitting elements each of which outputs light with a predetermined wavelength. In the present embodiment, for example, two kinds of semiconductor lasers are used as the solid-state light-emitting elements. One kind of the two kinds of semiconductor lasers is a light source (light source for excitation) that excites a fluorescent light body, and the other kind of semiconductor laser is a light source (light source for supplemental light) that supplements light in a wavelength range that is insufficient in a light source for excitation and fluorescent light. Specific examples of the light sources to be used include a semiconductor laser 111B (first light source) that oscillates light (B: light in a first wavelength range) in a blue wavelength range from a wavelength of 400 nm to a wavelength of 470 nm and a semiconductor laser 111R (second light source) that oscillates light (R; light in a second wavelength range) in a red wavelength range from a wavelength of 600 nm to a wavelength of 670 nm.

It should be noted that in a case where the light source section 110 includes a semiconductor laser, the light source section 110 may be configured to obtain excitation light with a predetermined output and supplemental light with use of one semiconductor laser, but may also be configured to combine light outputted from a plurality of semiconductor lasers to obtain excitation light with a predetermined output and supplemental light. In a case where the light source section 110 is configured using a plurality of semiconductor lasers 111B and a plurality of semiconductor lasers 111R, for example, to balance a position of red light R outputted from the light source section 110, it is preferable that the plurality of semiconductor lasers 111R be disposed averagely in the light source section 110. That is, it is preferable that the plurality of semiconductor lasers 11R be disposed to locate a center of XY coordinates thereof at about (0, 0). Examples of positions of the plurality of semiconductor lasers 111B and the plurality of the semiconductor lasers are described below.

Figure 2A:
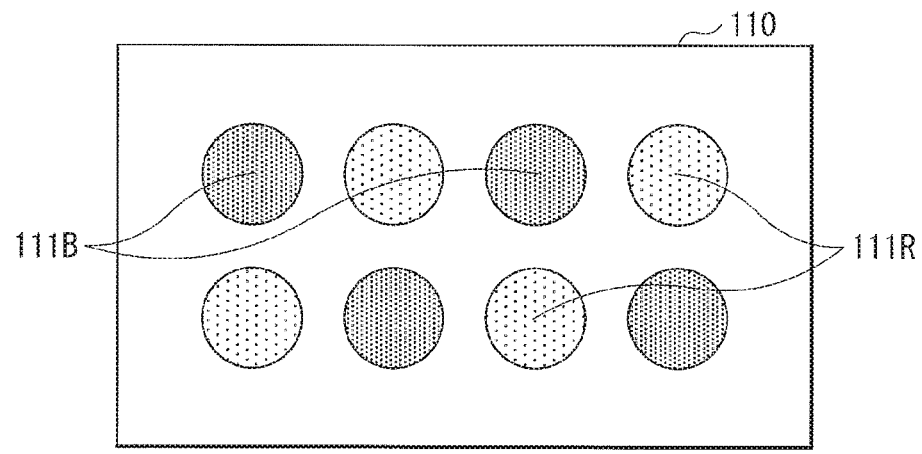
FIG. 2A is a schematic diagram illustrating an example of positions of light-emitting elements in the light source section illustrated in FIG. 1.
Figure 2B:
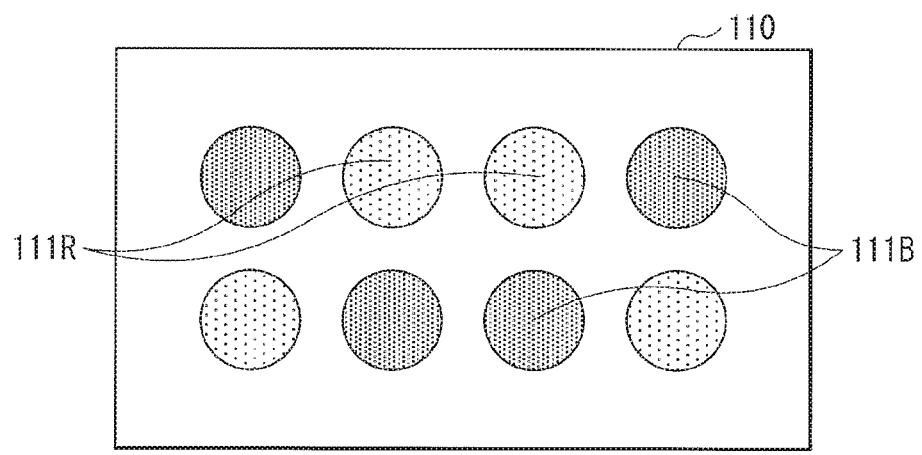
FIG. 2B is a schematic diagram illustrating another example of positions of the light-emitting elements in the light source section illustrated in FIG. 1.
Figure 2C:
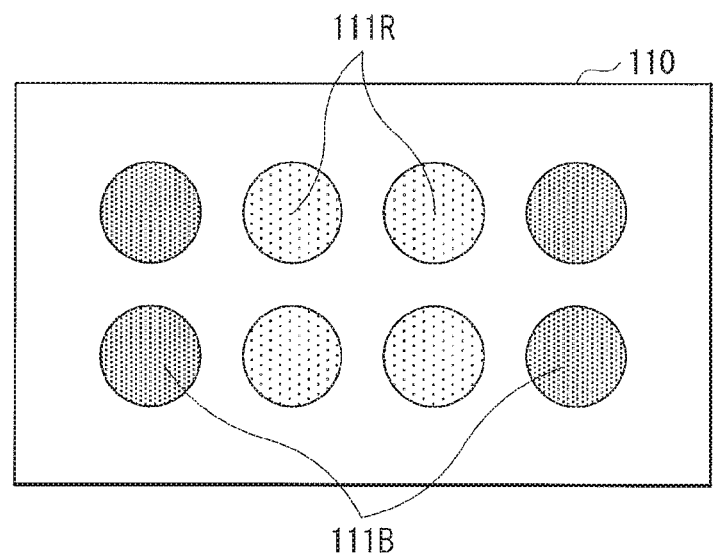
FIG. 2C is a schematic diagram illustrating another example of positions of the light-emitting elements in the light source section illustrated in FIG. 1.
Figure 2D:
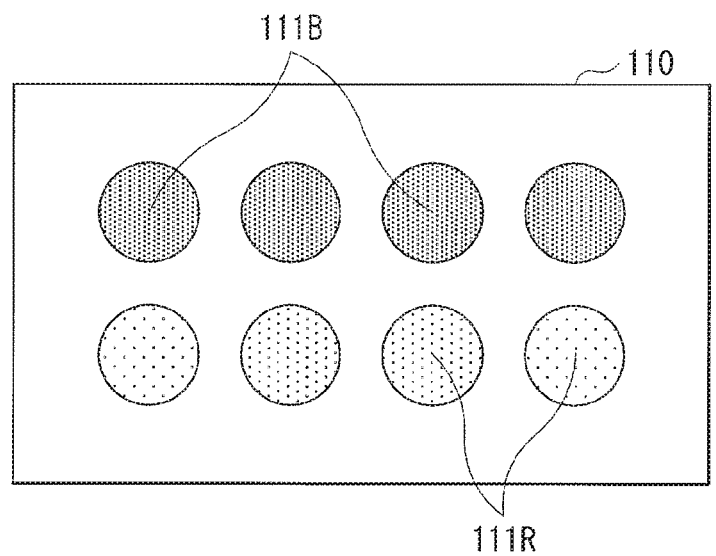
FIG. 2D is a schematic diagram illustrating another example of positions of the light-emitting elements in the light source section illustrated in FIG. 1.

FIGS. 2A to 2D are examples of positions of the semiconductor lasers 111B and 111R in the light source section 110 in which, for example, four semiconductor lasers 111B and four semiconductor lasers 111R are disposed in four rows and two columns. As described above, it is preferable that the plurality of semiconductor lasers 111B and the plurality of semiconductor lasers 111R be disposed to locate the center of the XY coordinates of the plurality of semiconductor lasers 111R at about (0, 0). For example, it is sufficient if the plurality of semiconductor lasers 111B and the plurality of semiconductor lasers 111R are disposed line-symmetrically. Accordingly, in a case where four semiconductor lasers 111B and four semiconductor lasers 111R are disposed in four rows and two columns, for example, as illustrated in FIG. 2A, the semiconductor lasers 111B and the semiconductor lasers 111R are alternately disposed. In addition, the four semiconductor lasers 111B and the four semiconductor lasers 111R may be disposed as illustrated in FIG. 2B and FIG. 2C, for example.

It should be noted that in a case where a plurality of semiconductor lasers is used, using a bank in which a plurality of semiconductor lasers oscillating laser light in the same wavelength range is disposed makes it possible to reduce cost. For example, in a case where the light source section 110 is configured using banks 1110X and 1110Y in which four semiconductor lasers 111B oscillating blue light B or four semiconductor lasers 111R oscillating red light R are disposed in a straight line, examples of the configuration of the light source section 110 include the following configurations.

Figure 3A:
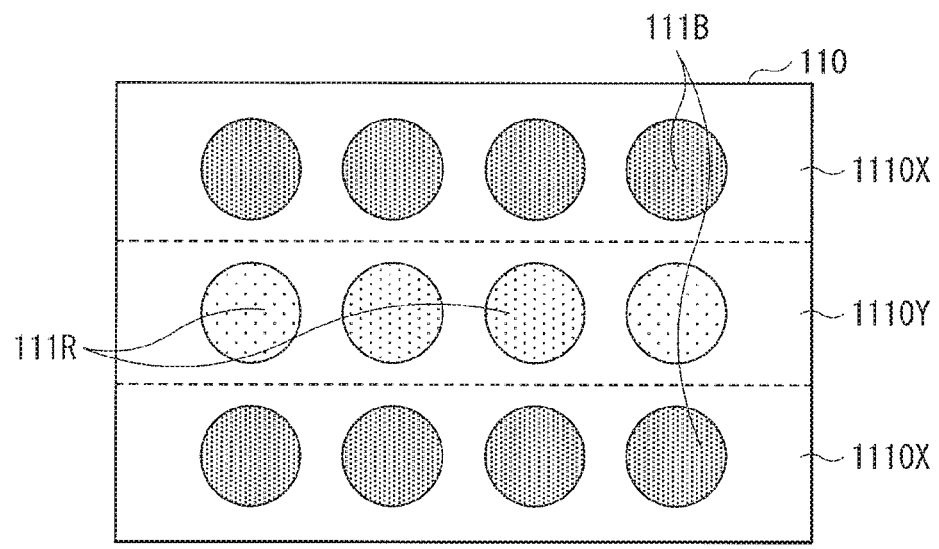
FIG. 3A is a schematic diagram illustrating another example of positions of the light-emitting elements in the light source section illustrated in FIG. 1.
Figure 3B:
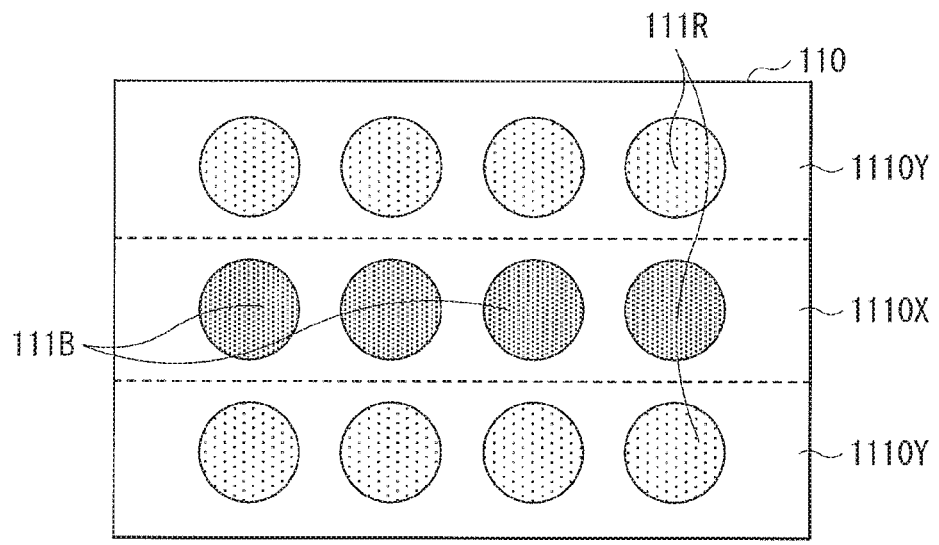
FIG. 3B is a schematic diagram illustrating another example of positions of the light-emitting elements in the light source section illustrated in FIG. 1.

FIGS. 3A and 3B are configuration examples of the light source section 110 using three banks in total, which include, for example, one or two of each of the banks 1110X in which four semiconductor lasers 111B are disposed and the banks 1110Y in which four semiconductor lasers 111R are disposed. Examples of a case where the light source section 110 is configured using two banks 1110X and one bank 1110Y include an example in which the one bank 1110Y is sandwiched between the two banks 1110X, as illustrated in FIG. 3A. Examples of a case where the light source section 110 is configured using one bank 1110X and two banks 1110Y include an example in which the one bank 1110X is sandwiched between the two banks 1110Y, as illustrated in FIG. 3B.

Figure 4A:
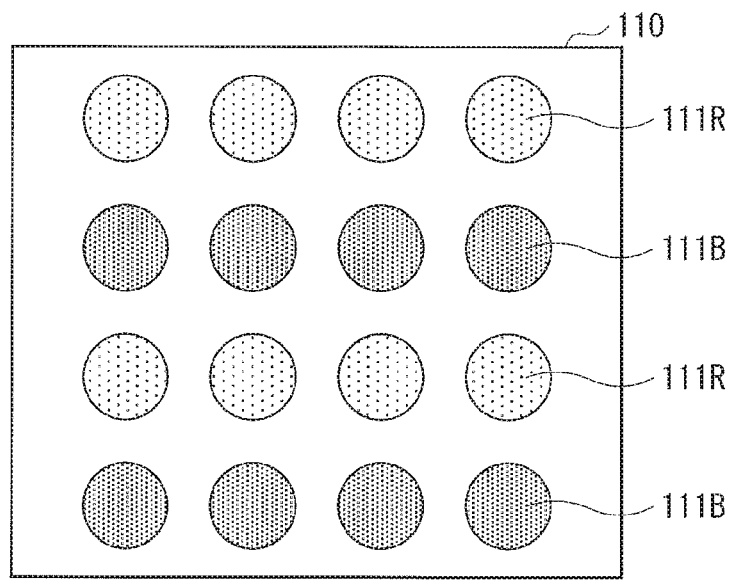
FIG. 4A is a schematic diagram illustrating another example of positions of the light-emitting elements in the light source section illustrated in FIG. 1.
Figure 4B:
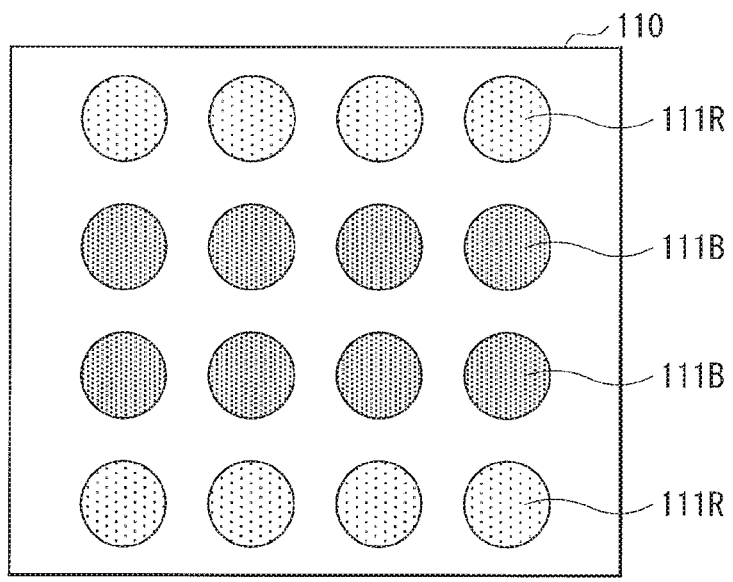
FIG. 4B is a schematic diagram illustrating another example of positions of the light-emitting elements in the light source section illustrated in FIG. 1.
Figure 4C:
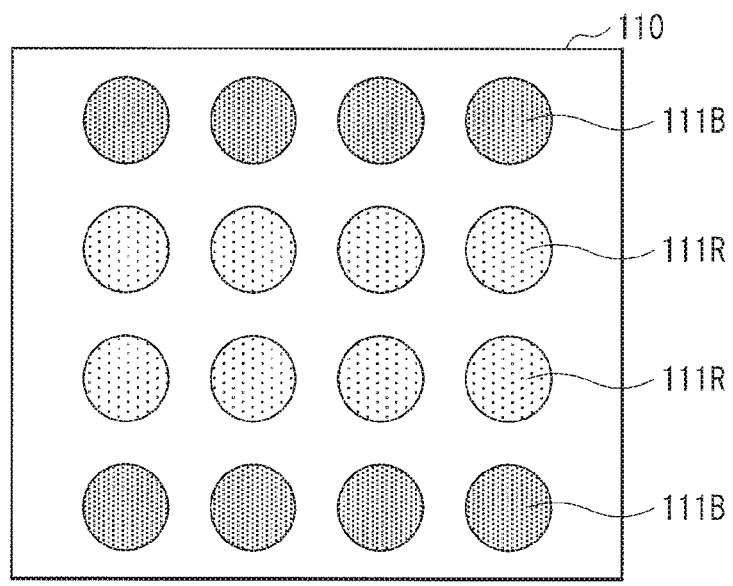
FIG. 4C is a schematic diagram illustrating another example of positions of the light-emitting elements in the light source section illustrated in FIG. 1.
Figure 4D:
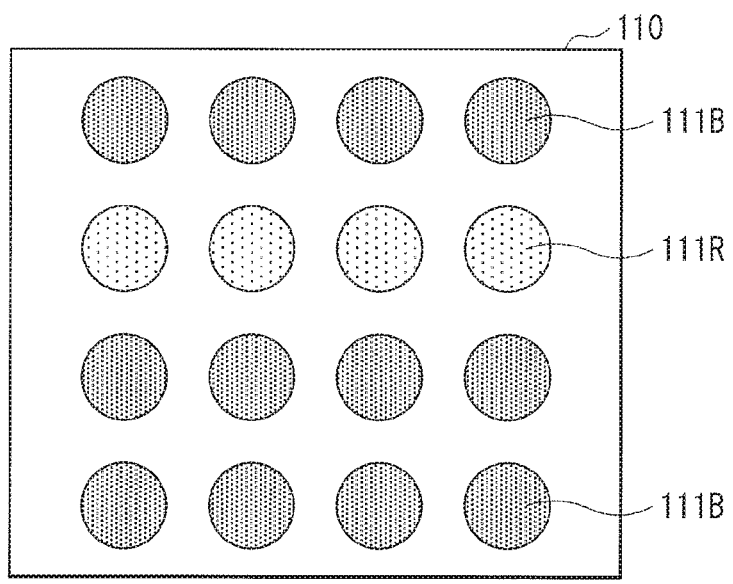
FIG. 4D is a schematic diagram illustrating another example of positions of the light-emitting elements in the light source section illustrated in FIG. 1.
Figure 5A:
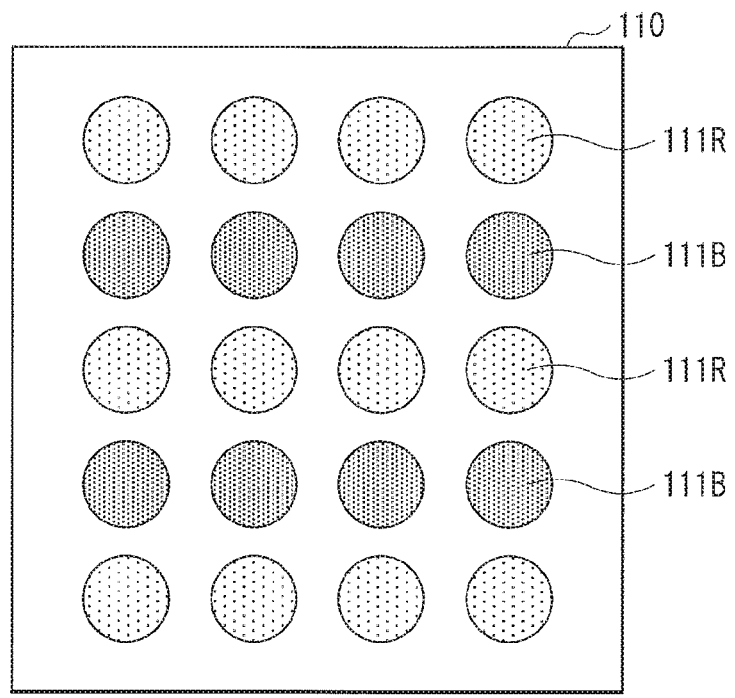
FIG. 5A is a schematic diagram illustrating another example of positions of the light-emitting elements in the light source section illustrated in FIG. 1.
Figure 5B:
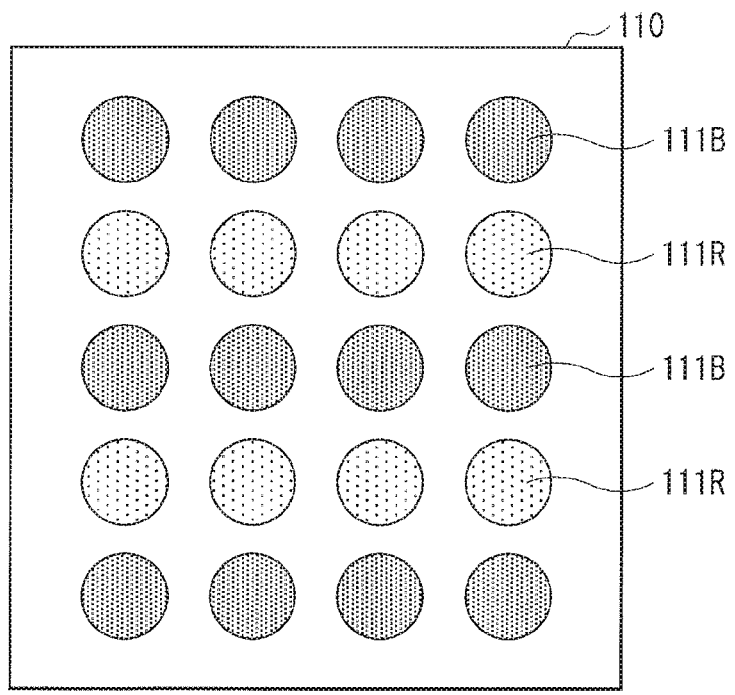
FIG. 5B is a schematic diagram illustrating another example of positions of the light-emitting elements in the light source section illustrated in FIG. 1.
Figure 5C:
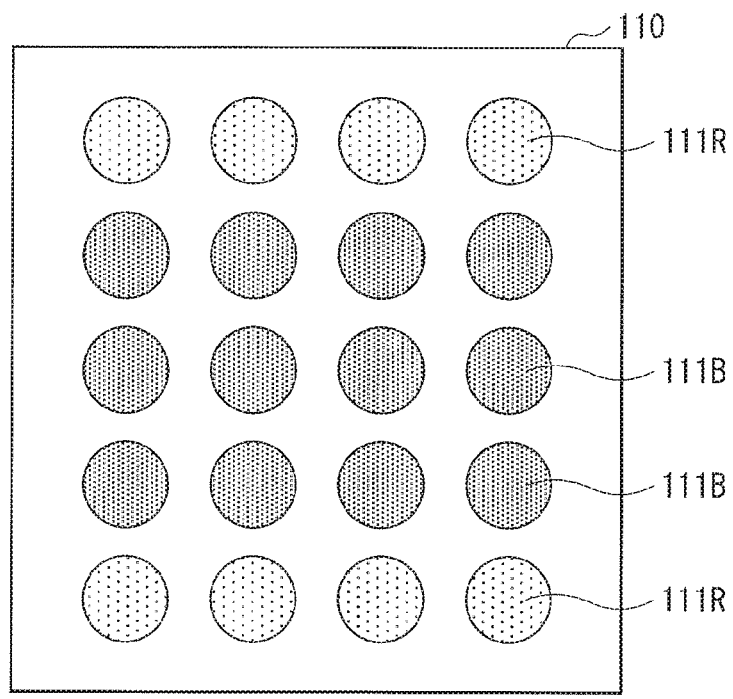
FIG. 5C is a schematic diagram illustrating another example of positions of the light-emitting elements in the light source section illustrated in FIG. 1.
Figure 5D:
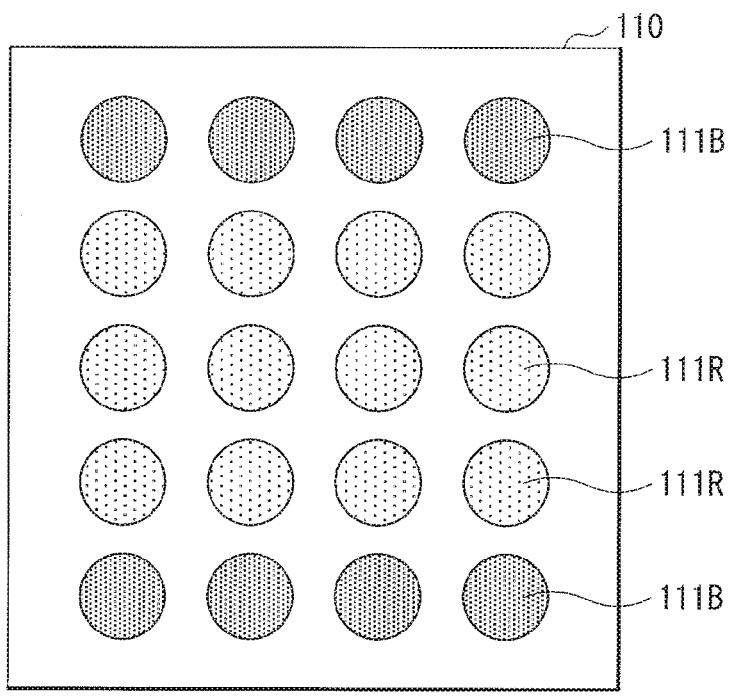
FIG. 5D is a schematic diagram illustrating another example of positions of the light-emitting elements in the light source section illustrated in FIG. 1.
Figure 6A:
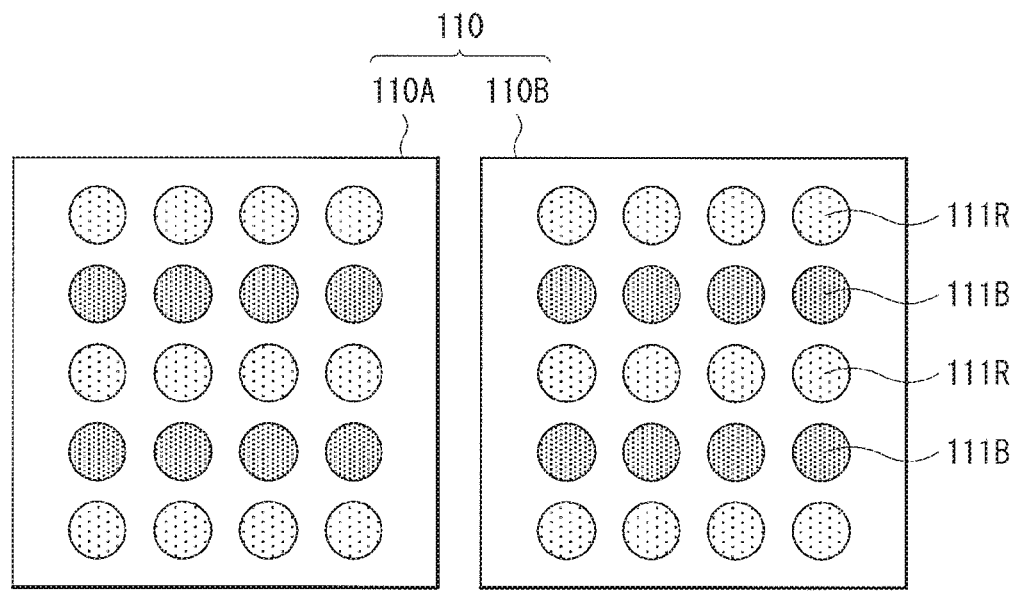
FIG. 6A is a schematic diagram illustrating another example of positions of the light-emitting elements in the light source section illustrated in FIG. 1.
Figure 6B:
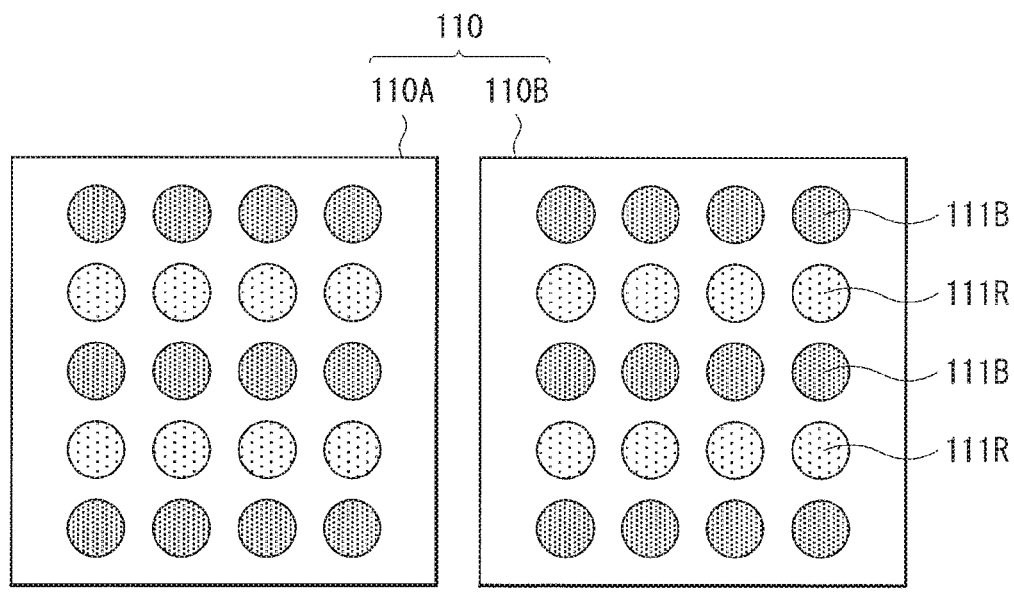
FIG. 6B is a schematic diagram illustrating another example of positions of the light-emitting elements in the light source section illustrated in FIG. 1.
Figure 6C:
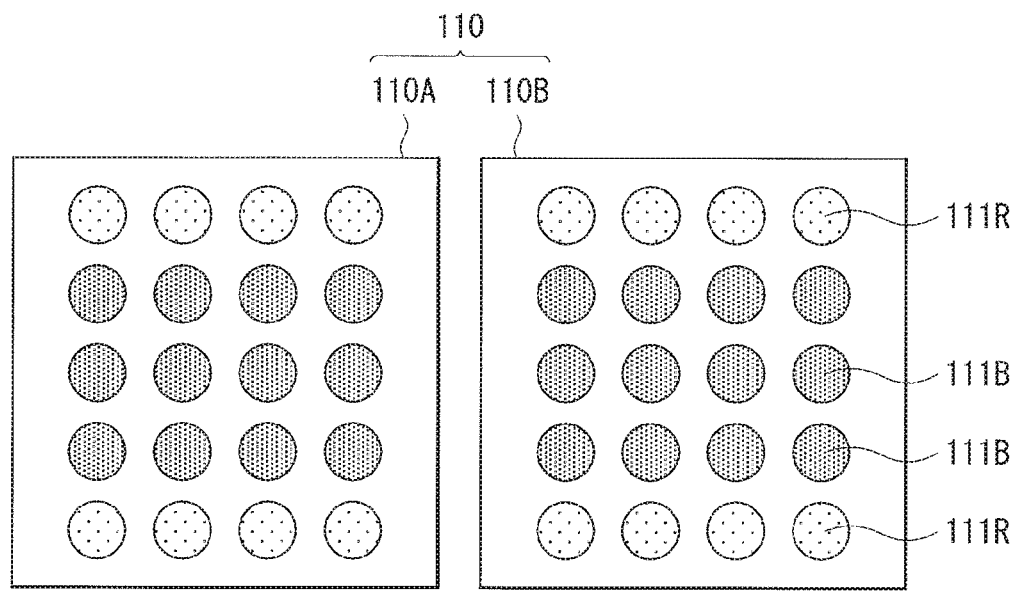
FIG. 6C is a schematic diagram illustrating another example of positions of the light-emitting elements in the light source section illustrated in FIG. 1.
Figure 6D:
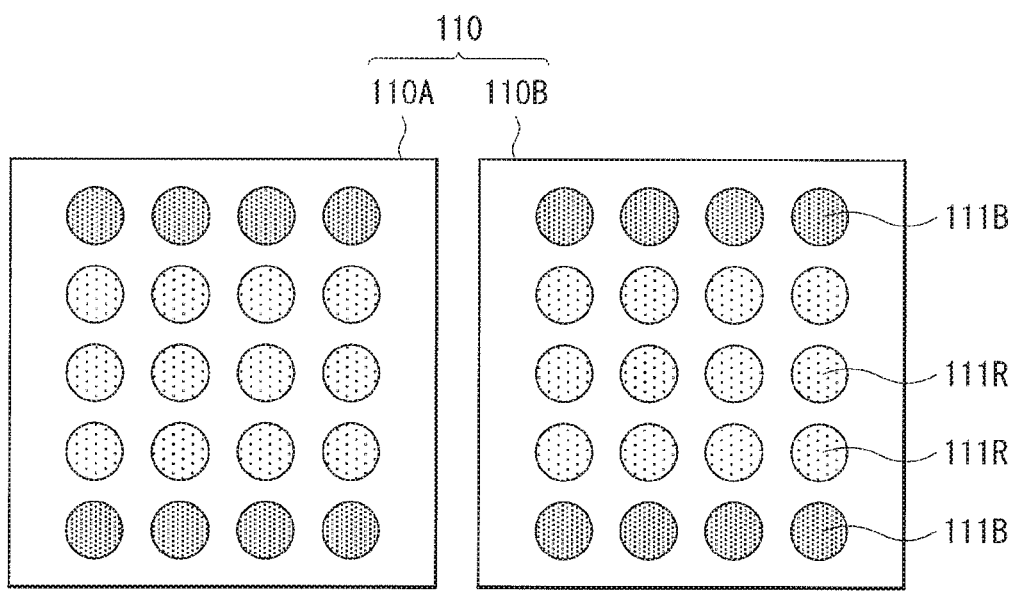
FIG. 6D is a schematic diagram illustrating another example of positions of the light-emitting elements in the light source section illustrated in FIG. 1.
Figure 6E:
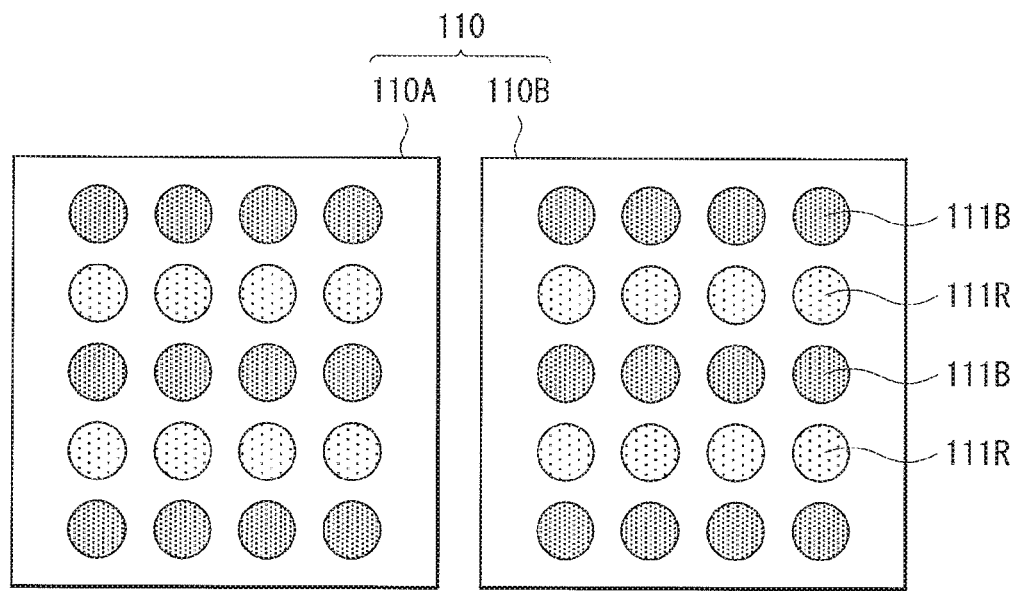
FIG. 6E is a schematic diagram illustrating another example of positions of the light-emitting elements in the light source section illustrated in FIG. 1.
Figure 6F:
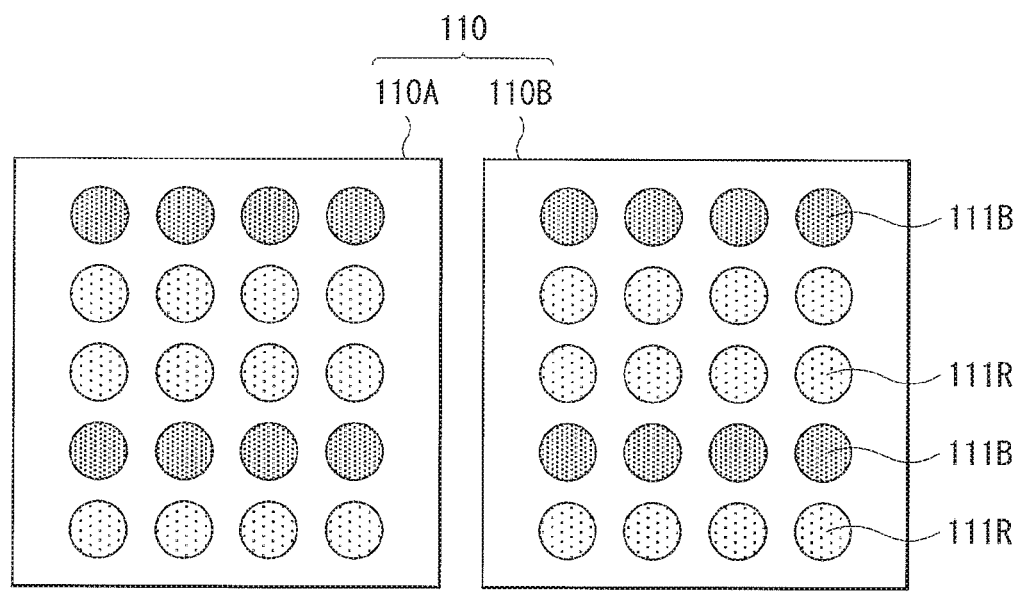
FIG. 6F is a schematic diagram illustrating another example of positions of the light-emitting elements in the light source section illustrated in FIG. 1.
Figure 6G:
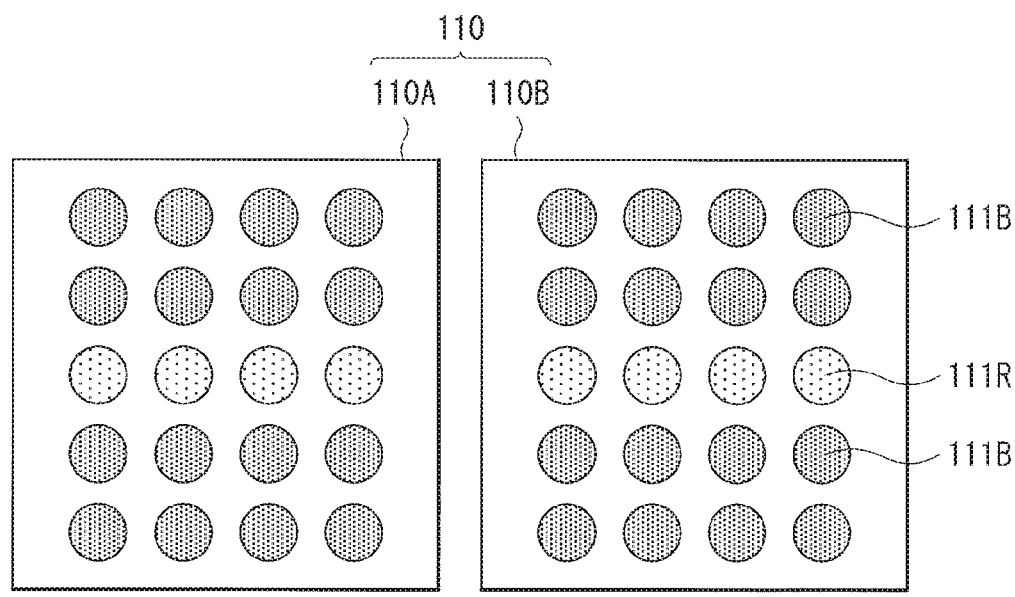
FIG. 6G is a schematic diagram illustrating another example of positions of the light-emitting elements in the light source section illustrated in FIG. 1.
Figure 6H:
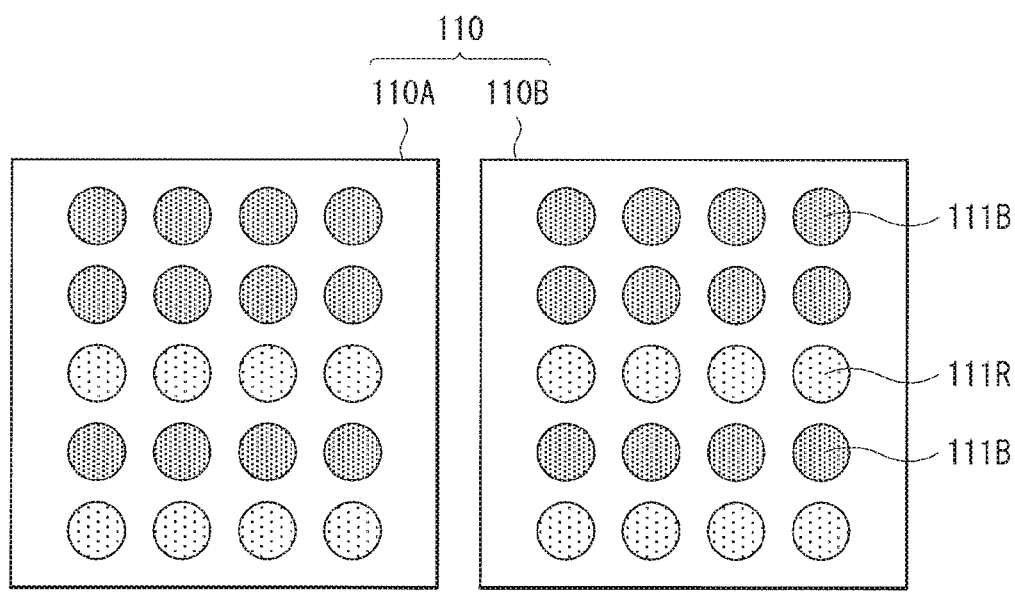
FIG. 6H is a schematic diagram illustrating another example of positions of the light-emitting elements in the light source section illustrated in FIG. 1.
Figure 7A:
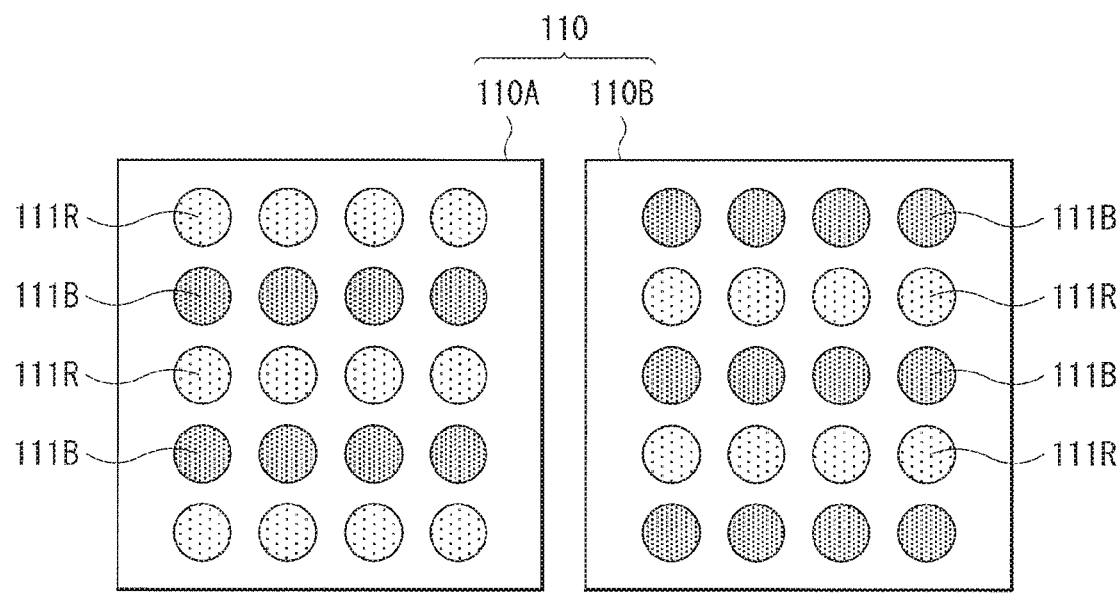
FIG. 7A is a schematic diagram illustrating another example of positions of the light-emitting elements in the light source section illustrated in FIG. 1.
Figure 7B:
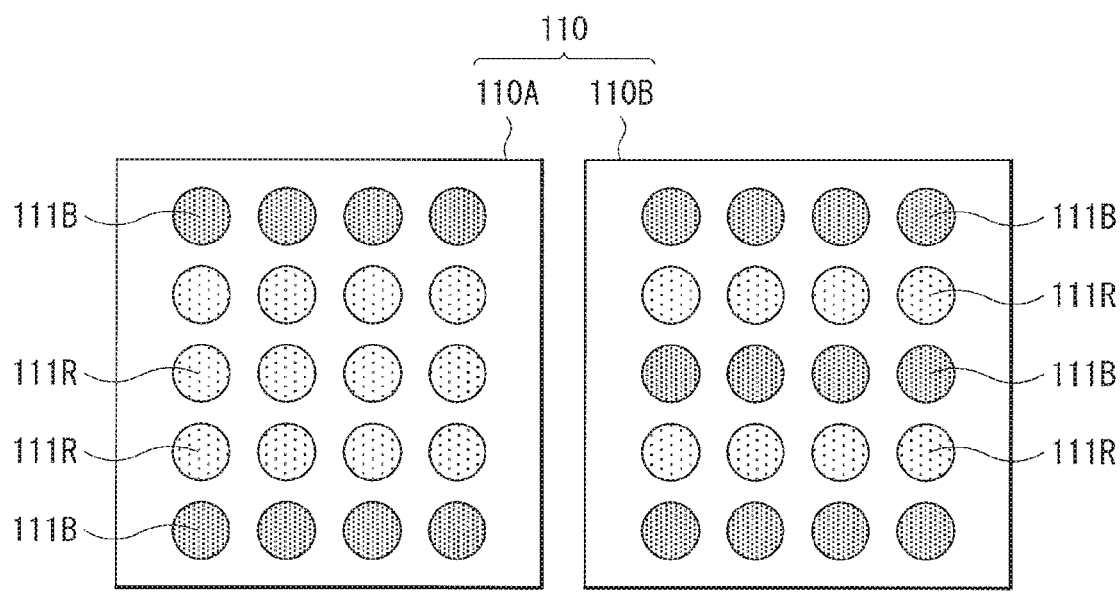
FIG. 7B is a schematic diagram illustrating another example of positions of the light-emitting elements in the light source section illustrated in FIG. 1.
Figure 7C:
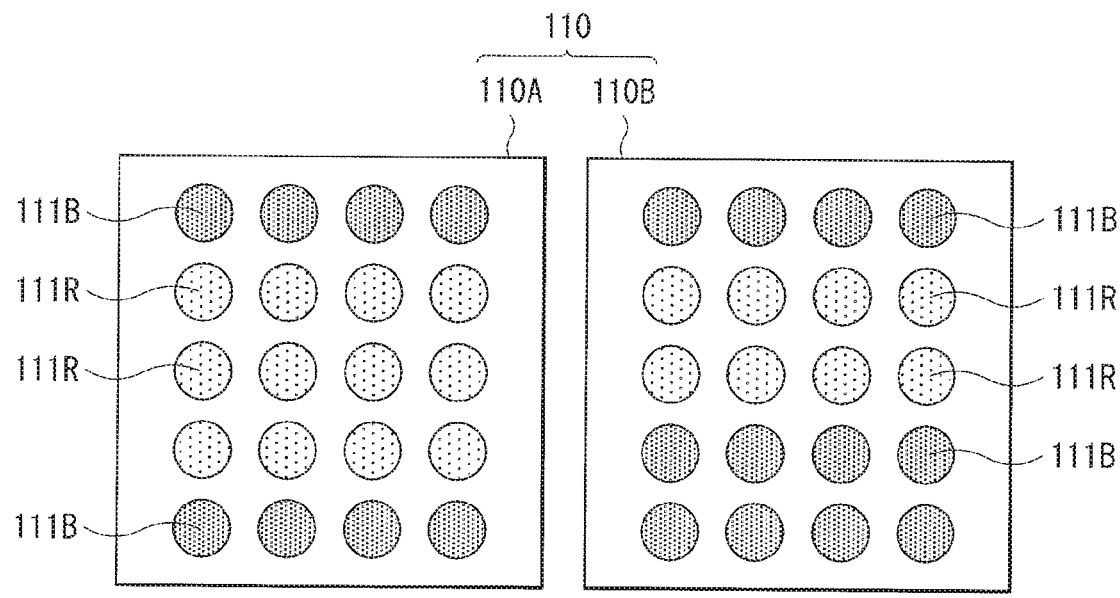
FIG. 7C is a schematic diagram illustrating another example of positions of the light-emitting elements in the light source section illustrated in FIG. 1.
Figure 7D:
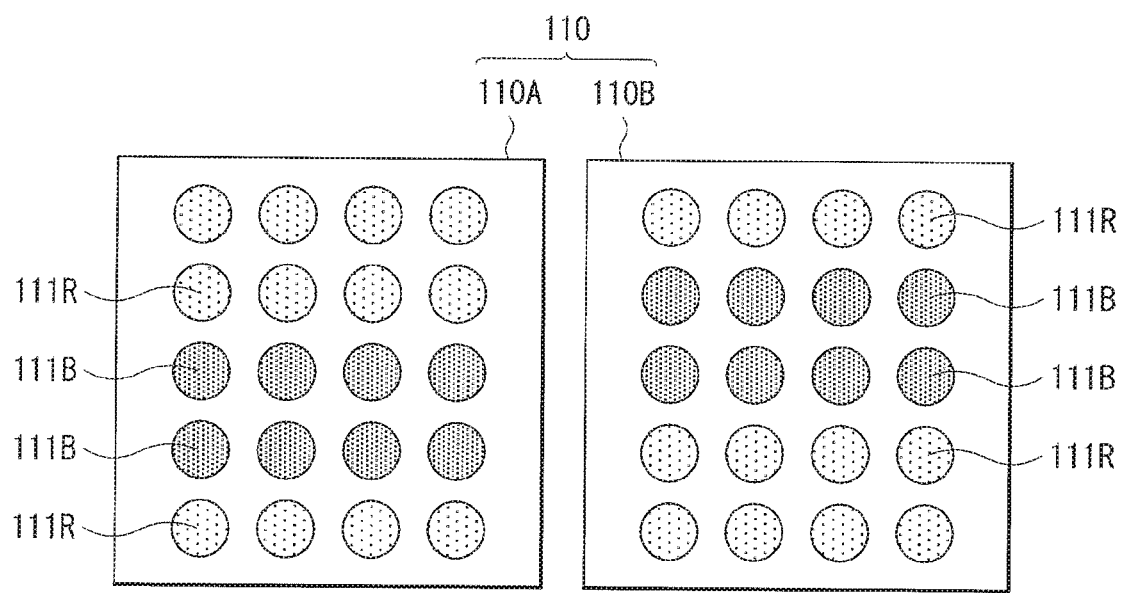
FIG. 7D is a schematic diagram illustrating another example of positions of the light-emitting elements in the light source section illustrated in FIG. 1.
Figure 7E:
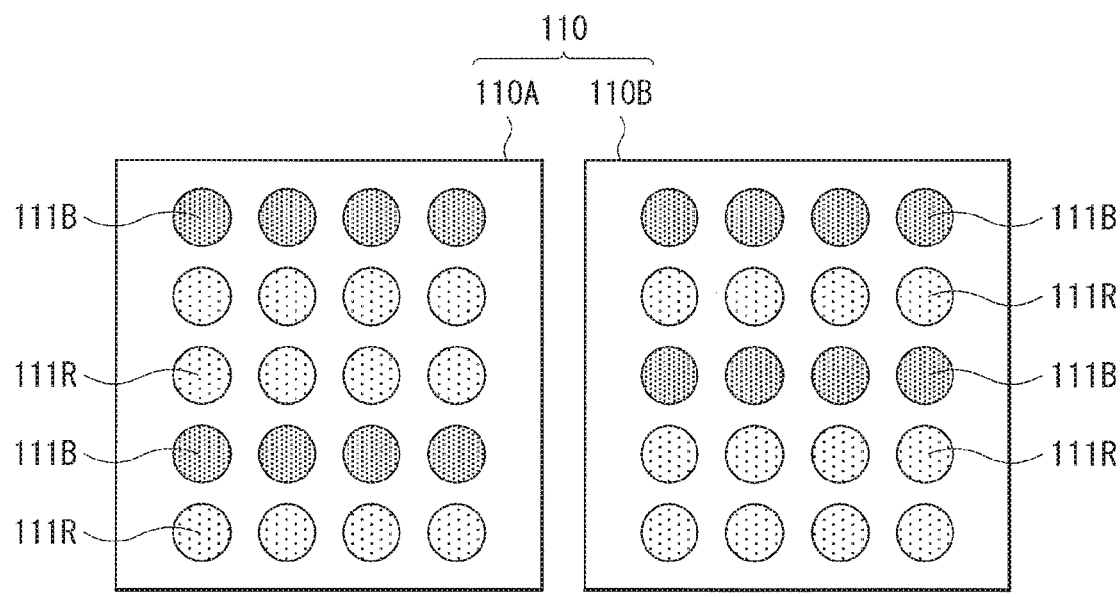
FIG. 7E is a schematic diagram illustrating another example of positions of the light-emitting elements in the light source section illustrated in FIG. 1.
Figure 7F:
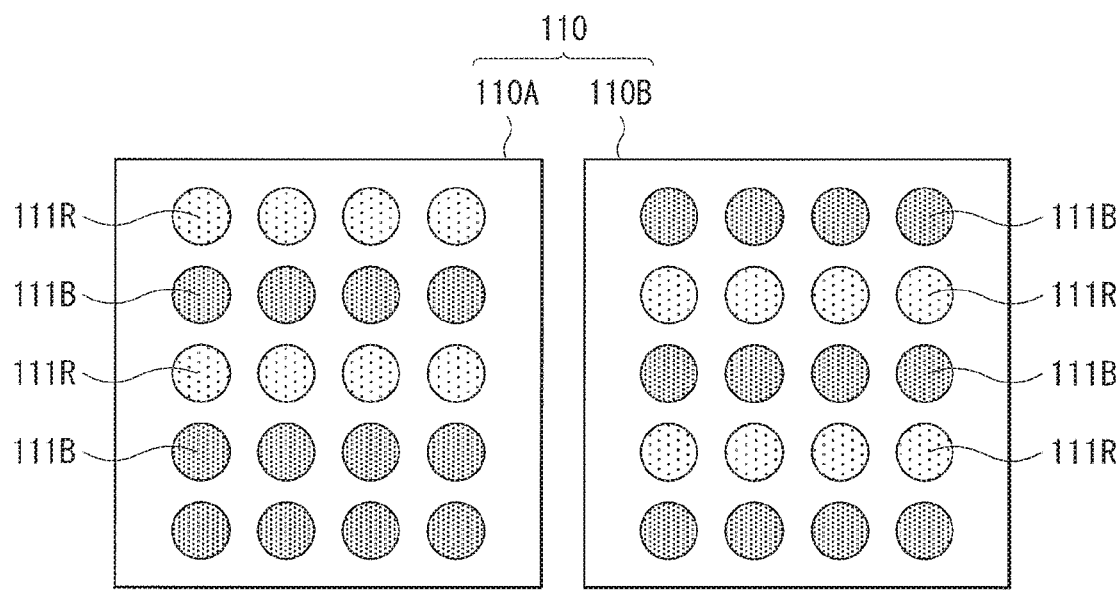
FIG. 7F is a schematic diagram illustrating another example of positions of the light-emitting elements in the light source section illustrated in FIG. 1.

The light source section 110 may be configured using two banks 1110X and two banks 1110Y, for example. Examples of such a case include configuration examples illustrated in FIGS. 4A to 4C as examples. In addition, it is not necessary to configure the light source section 110 using two banks 1110X and two banks 1110Y, and the light source section 110 may be configured using three banks 1110X and one bank 1110Y, for example, as illustrated in FIG. 4D.

Further, the light source section 110 may be configured using five banks in total, which include, for example, two or three of each of the banks 1110X and the banks 1110Y. Examples of such a case include configuration examples illustrated in FIGS. 5A to 5D as examples.

Furthermore, the light source section 110 may include two light source sections 110A and 110B. Examples of such a case include a configuration in which two light source sections 110A and 110B having the same disposition of the semiconductor lasers 111B and 111R are combined as illustrated in FIGS. 6A to 6H. In addition, examples of such a case are not limited thereto, and may include examples in which two light source sections 110A and 110B having different dispositions of the semiconductor lasers 111B and 111R are combined, as illustrated in FIGS. 7A to 7F.

It should be noted that FIGS. 3A to 7F illustrate examples using the banks 1110X and 1110Y in which four semiconductor lasers 111B and four semiconductor lasers 111R are disposed, but the number of each of the semiconductor lasers 111B and 111R included in each of the banks 1110X and 1110Y is not limited thereto. In each of the banks 1110X and 1110Y, two or three, or five or more of each of the semiconductor lasers 111B and 111R may be disposed in a straight line, for example, and the semiconductor lasers 111B and 111R may be disposed in four rows and two columns on each one of the banks 1110X and 1110Y, for example.

The lens 112 concentrates, on a predetermined spot diameter, the blue light B and the red light R outputted from the light source section 110, and outputs the blue light B and the red light R toward the dichroic mirror 113.

The dichroic mirror 113 selectively reflects light in a predetermined wavelength range, and selectively transmits light in the other wavelength ranges. In the present embodiment, the dichroic mirror 113 reflects, in a direction of the $\lambda/4$ wave plate 114, the blue light B and the red light R outputted from the light source section 110, and causes yellow light (fluorescent light FL) and the red light incident from the fluorescent light body wheel 10 through the light-condensing lens 115 to enter an illumination optical system 200 (to be described later). It should be noted that reflection and transmission of the red light R is selected by polarization of the red light R. For example, the red light R is polarized and separated by the dichroic mirror 113. For example, S-polarized light is reflected, and P-polarized light is transmitted.

The $\lambda/4$ wave plate 114 is a phase shifter causing a phase shift of $\pi/2$ with respect to incident light, and converts the incident light that is linearly polarized light into circularly polarized light, and converts the incident light that is circularly polarized light into linearly polarized light. In the present embodiment, the linearly polarized blue light B and the linearly polarized red light R reflected by the dichroic mirror 113 are converted into circularly polarized blue light B and circularly polarized red light R by the quarter-wave plate 114. In addition, the circularly polarized red light R reflected by the dichroic film 13 is converted into linearly polarized light by the quarter-wave plate 114.

The light-condensing lens 115 concentrate, on a predetermined spot diameter, the blue light B and the red light R that have been reflected by the dichroic mirror 113 and transmitted through the $\lambda/4$ wave plate 114, and outputs the concentrated blue light B and the concentrated red light R toward the fluorescent light body wheel 10. In addition, the light-condensing lens 115 outputs, toward the $\lambda/4$ wave plate 114, the fluorescent light FL outputted from the fluorescent light body wheel 10. Further, in the present embodiment, the light-condensing lens 115 also outputs, toward the $\lambda/4$ wave plate 114, the red light R reflected by the dichroic film 13 disposed on the fluorescent light body wheel 10, as with the fluorescent light FL.

Figure 8A:
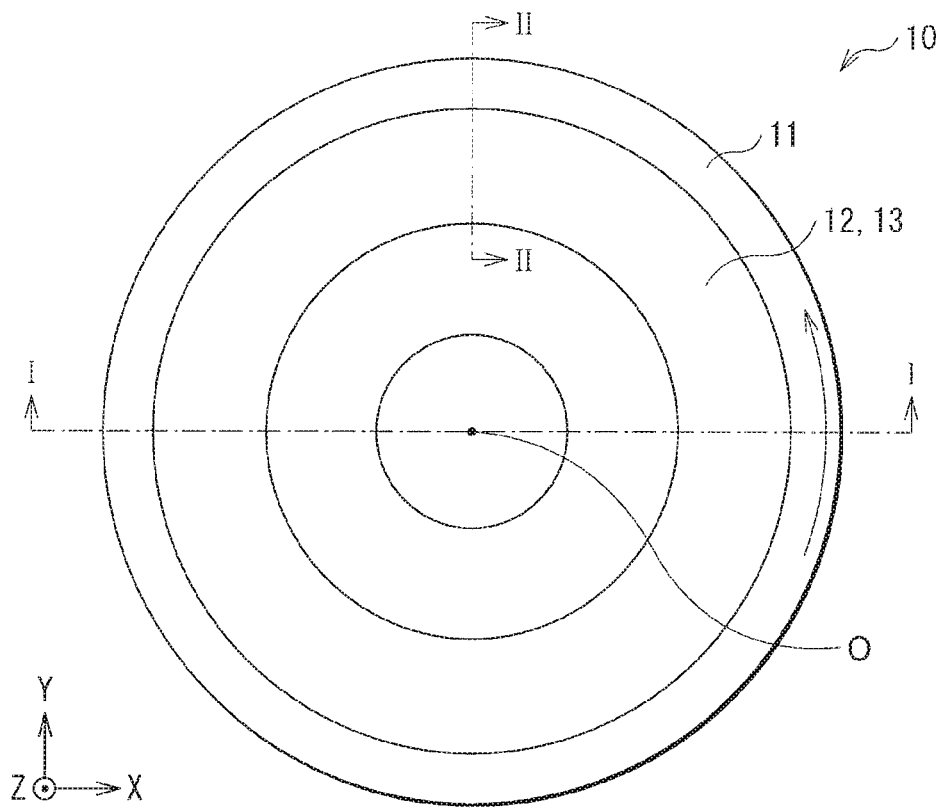
FIG. 8A is a schematic plan view of an example of a configuration of a fluorescent light body wheel illustrated in FIG. 1.
Figure 8B:
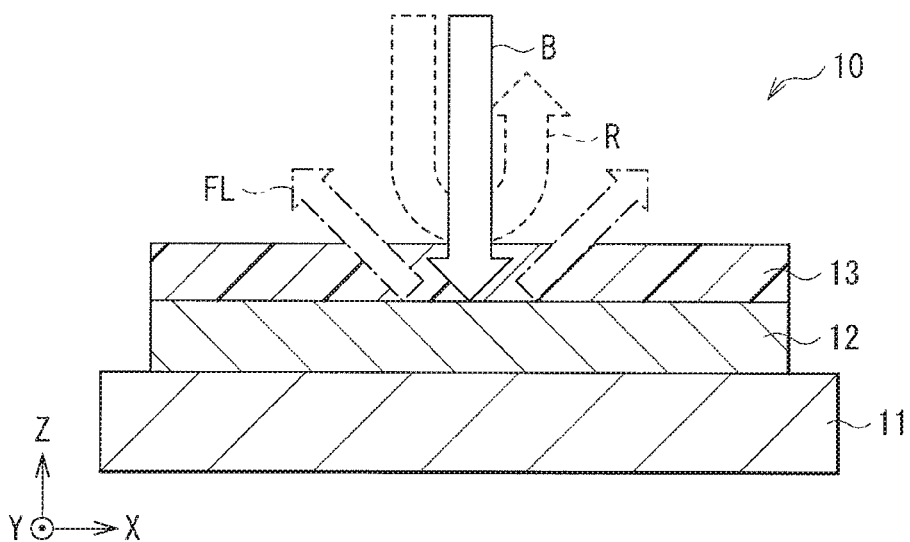
FIG. 8B is a schematic cross-sectional view of the configuration of the fluorescent light body wheel illustrated in FIG. 8A.

FIG. 8A schematically illustrates a planar configuration of the fluorescent light body wheel 10, and FIG. 8B schematically illustrates a cross-sectional configuration taken along a line II-II of FIG. 8A of the fluorescent light body wheel 10. It should be noted that the fluorescent light body wheel 10 illustrated in FIG. 1 illustrates a cross-sectional configuration taken along a line I-I of FIG. 8A. The fluorescent light body wheel 10 includes the fluorescent light body layer 12 and the dichroic film 13 provided in this order on the supporting substrate 11 rotatable around a rotating axis (for example, the shaft 14J). The fluorescent light body layer 12 and the dichroic film 13 are provided on a light incident surface (surface S1) side of the supporting substrate 11, and disposed in this order with respect to the light source section 110.

The supporting substrate 11 supports the fluorescent-light body layer 12 and the dichroic film 13. The supporting substrate 11 has, for example, a disk shape. In addition, the supporting substrate 11 preferably has a function of a heat dissipator. The supporting substrate 11 includes an inorganic material such as a metal material or a ceramic material, which has high thermal conductivity and to which mirror-finish processing is applicable. The material included in the supporting substrate 11 includes, for example, a single metal such as aluminum (Al), copper (Cu), molybdenum (Mo), tungsten (W), cobalt (Co), chromium (Cr), platinum (Pt), tantalum (Ta), lithium (Li), zirconium (Zr), ruthenium (Ru), rhodium (Rh), or palladium (Pd), or an alloy containing one or more kinds of these materials. Alternatively, it is also possible to use an alloy such as CuW in which the percentage of W contained is 80 atomic % or higher, or CuMo in which the percentage of Mo contained is 40 atomic % or higher, as the metal material included in the supporting substrate 11. The ceramic material includes, for example, a material containing silicon carbide (SiC), aluminum nitride (AlN), beryllium oxide (BeO), a composite material of Si and SiC, or a composite material of SiC and Al (where the percentage of SiC contained is 50% or higher). The supporting substrate 11 is rotatable in an direction of an arrow C around a normal line passing through a center of the supporting substrate 11 as a rotating axis O by the motor 41, for example.

The fluorescent-light body layer 12 includes a plurality of fluorescent light body particles. It is preferable that the fluorescent-light body layer 12 be formed, for example, in a plate shape. For example, the fluorescent-light body layer 12 includes a so-called ceramic fluorescent light body. The fluorescent-light body layer 12 is formed, for example, continuously in a rotation circumferential direction on the supporting substrate 11. The fluorescent light body particles are fluorescent light bodies in a form of particle that absorb the excitation light EL (blue light B) radiating from the light source section 110 to output the fluorescent light FL. For example, as the fluorescent light body particles, a fluorescent material is used that is excited by blue laser light having a wavelength in the blue wavelength range (for example, from 400 nm to 470 nm) to output yellow fluorescent light (light in a wavelength range between the red wavelength range and a green wavelength range). Examples of such a fluorescent material include a YAG (yttrium-aluminum-garnet)-based material. The average particle size of the fluorescent light body particles is, for example, 5 µm or more and 40 µm or less. It is preferable that the fluorescent-light body layer 12 be formed to have a thickness of, for example, 40 µm or more and 200 µm or less.

As described in detail later, the dichroic film 13 transmits at least a portion of the blue light B and reflects at least a portion of the red light R in accordance with incident angles to the fluorescent light body layer 12, and transmits a portion of the fluorescent light FL outputted from the fluorescent light body layer 12, and then combines the blue light B, the red light R, and the fluorescent light FL and outputs thus-combined light toward the light-condensing lens 115.

The motor 14 drives the fluorescent light body wheel 10 to rotate at a predetermined rotational speed. The motor 14 drives the fluorescent light body wheel 10 to rotate the fluorescent light body layer 12 in a plane perpendicular to a radiation direction of the excitation light (blue light B) outputted from the light source section 110. Thus, an irradiated position of the fluorescent light body wheel 10 with the excitation light temporally changes (moves) in a plane perpendicular to the radiation direction of the excitation light at speed corresponding to the rotational speed.

Figure 9A:
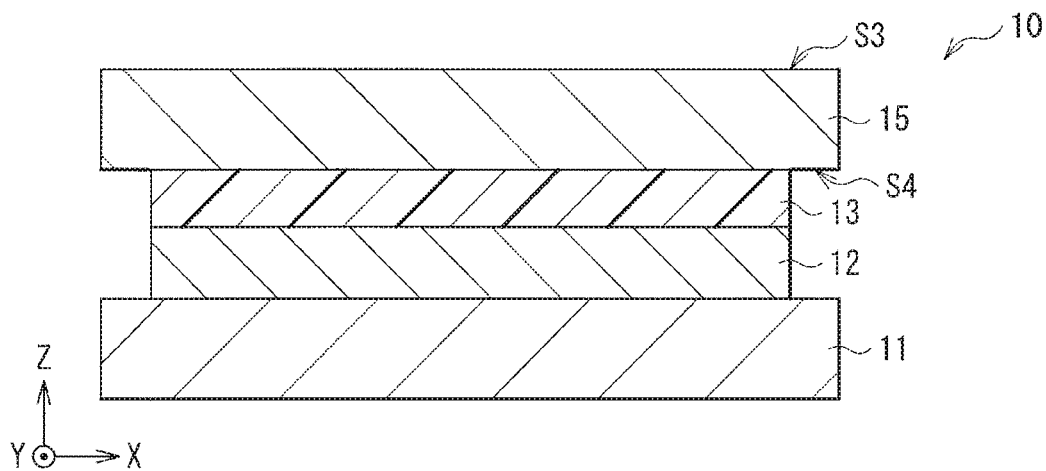
FIG. 9A is a schematic cross-sectional view of another example of the configuration of the fluorescent light body wheel illustrated in FIG. 8A.
Figure 9B:
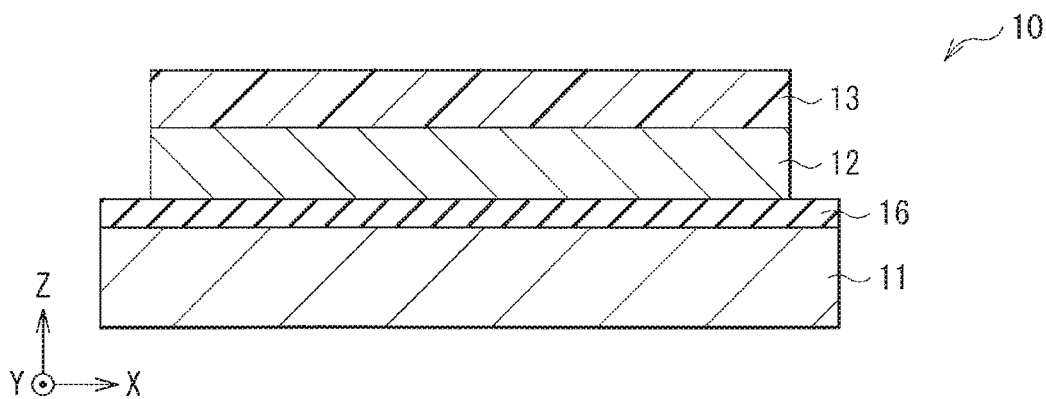
FIG. 9B is a schematic cross-sectional view of another example of the configuration of the fluorescent light body wheel illustrated in FIG. 8A.

In addition, the fluorescent light body wheel 10 according to the present embodiment may include a member other than members described above. FIGS. 9A to 9B each schematically illustrate another example of the cross-sectional configuration of the fluorescent light body wheel 10 according to the present embodiment.

The fluorescent light body wheel 10 may include a cover glass 15 disposed above the supporting substrate 11, for example, as illustrated in FIG. FIG. 9A. In a case where the cover glass 15 is disposed above the supporting substrate 11 in such a manner, the fluorescent light body layer 12 may use fluorescent light bodies in a form of particle (fluorescent light body particles) and may be formed by filling space between the supporting substrate 11 and the cover glass 15 with the fluorescent light body particles. In such a case, the dichroic film 13 is formed by dichroic processing on a surface opposed to the supporting substrate 11 of the cover glass 15. A front surface (light incident surface, surface S3) and a back surface (surface S4) of the cover glass 15 may be diffusion surfaces, for example.

The cover glass 15 includes a material having light transmissivity, and has a property of transmitting the blue light B, the red light R, and the fluorescent light FL obtained through conversion by the fluorescent light body particles. Examples of a material included in the cover glass 15 include quartz, glass, sapphire, crystal, and the like. Of these materials, sapphire having high thermal conductivity is preferably used. In addition to these materials, it is possible to use a resin material such as polyethylene terephthalate (PET) and a silicone resin in a case where the light source device 100 uses a light source with a low output.

It should be noted that although not illustrated in FIG. 9A, for example, it is preferable that a sealant or the like be provided between the supporting substrate 11 and the cover glass 15 to seal a periphery of the fluorescent light body layer 12.

In addition, in the fluorescent light body wheel 10, for example, as illustrated in FIG. 9B, a reflective film 16 is preferably formed on the surface S1 side of the supporting substrate 11. The reflective film 16 includes, for example, a metal film or the like containing a metal element such as aluminum (Al), silver (Ag), or titanium (Ti) in addition to a dielectric multilayer film. The reflective film 16 reflects blue light radiating from the light source section 110 and the fluorescent light FL obtained by conversion in the fluorescent light body layer 12, and functions to enhance light emission efficiency in the fluorescent light body wheel 10. It should be noted that in a case where the reflective film 16 is formed, the supporting substrate 11 may not have light reflectivity. In such a case, it is possible to use quartz or glass for the supporting substrate 11 in addition to a crystalline material such as single Si, SiC, diamond, or sapphire.

Figure 9C:
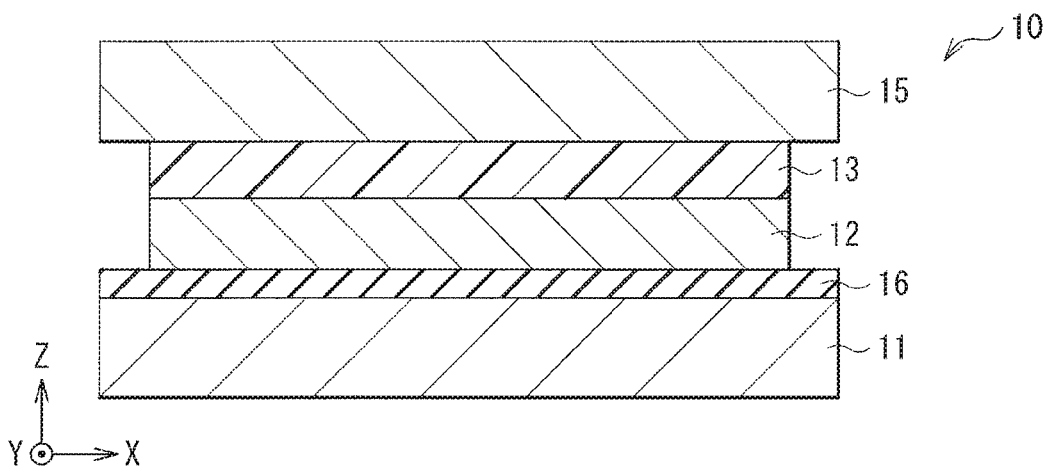
FIG. 9C is a schematic cross-sectional view of another example of the configuration of the fluorescent light body wheel illustrated in FIG. 8A.

Further, the fluorescent light body wheel 10 may be formed by forming the reflective film 16 on the surface S1 side of the supporting substrate 11 and disposing the cover glass 15 above the supporting substrate 11, and filling space between the supporting substrate 11 and the cover glass 15 with the fluorescent light body particles, for example, as illustrated in FIG. 9C.

It should be noted that the dichroic film 13 is preferably provided above the fluorescent light body layer 12, and providing the dichroic film 13 directly above the fluorescent light body layer 12 makes it possible to more efficiently transmit or reflect the blue light B, the red light R, and the fluorescent light FL by angle characteristics.

Next, description is given of angle characteristics with respect to the red light R of the dichroic film 13 according to the present embodiment.

The dichroic film 13 according to the present embodiment reflects the red light R outputted from the light source section 110, and transmits the blue light B outputted from the light source section 110 and the fluorescent light FL outputted from the fluorescent light body layer 12, and combines the blue light B, the red light R, and the fluorescent light FL on the same axis. Reflection of the red light R and transmission of the blue light B are selected by incident angles of the red light R and the blue light B to the dichroic film 13.

Figure 10A:
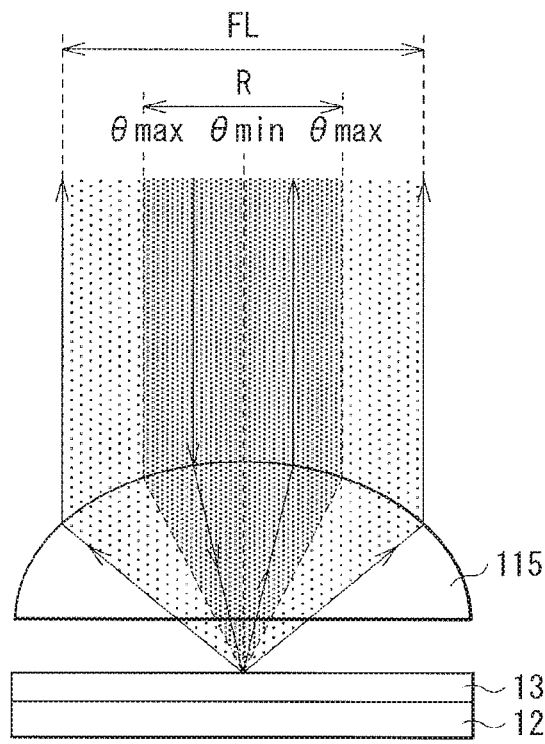
FIG. 10A is a schematic diagram describing an example of angle characteristics of a dichroic film in a case where an incident angle of red light R is 0° to a low angle.
Figure 10B:
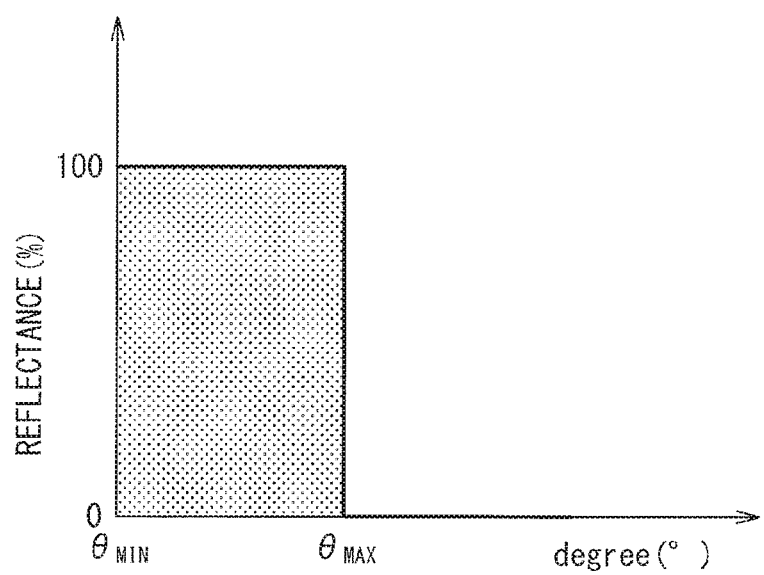
FIG. 10B is a characteristic diagram illustrating an example of a relationship between an incident angle and reflectance of the dichroic film in FIG. 10A.

FIG. 10A schematically illustrates angle characteristics of the dichroic film 13 in a case where the incident angle of the red light R is form 0° to a low angle. FIG. 10B illustrates a relationship between the incident angle and reflectance of the dichroic film 13 in FIG. 10A. In a case where the incident angle of the red light R is from 0° to a low angle, it is preferable that the dichroic film 13 reflect light in a range from a minimum incident angle (θmin=0°) to a maximum incident angle (θmax<90°) of the red light R and totally transmit light out of the range from the minimum incident angle (θmin=0°) to the maximum incident angle (θmax<90°) of the red light R, for example, as illustrated in FIG. 10B. The fluorescent light FL outputted from the fluorescent light body layer 12 is outputted through the dichroic film 13 in an incident direction of the blue light B and the red light R outputted from the light source section 110, as illustrated in FIG. 10A, but a red component included in the fluorescent light FL is reflected within the range of the incident angle (from θmin to θmax) of the red light R, and is transmitted out of the range of the incident angle described above. In addition, although not illustrated, the blue light B is preferably totally transmitted.

Figure 11A:
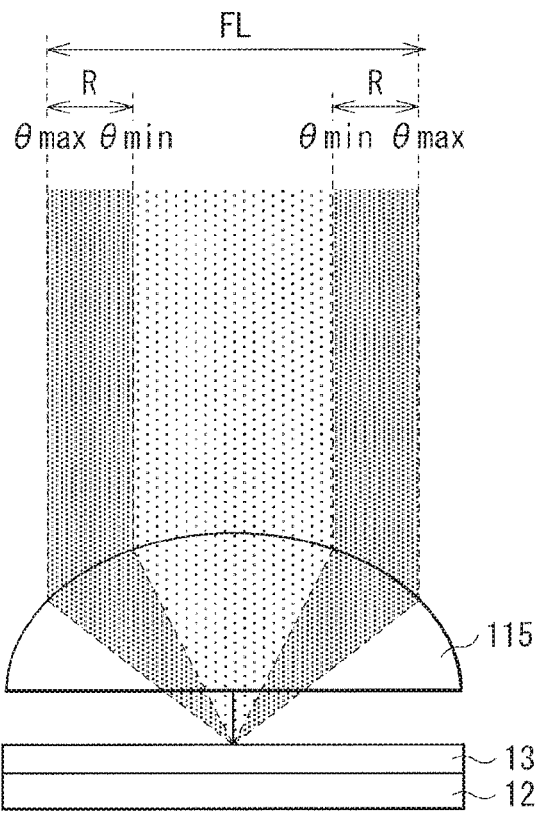
FIG. 11A is a schematic diagram describing another example of angle characteristics of the dichroic film in a case where the incident angle of the red light R is from a high angle to 90°.
Figure 11B:
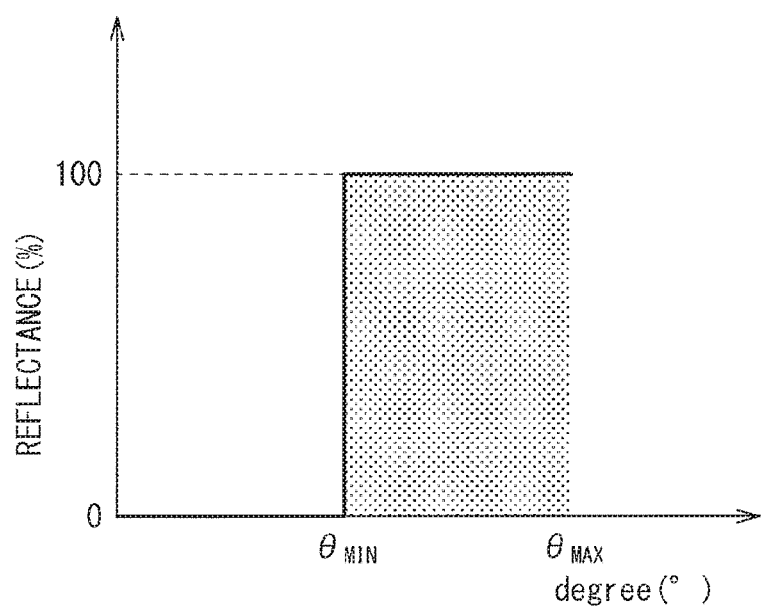
FIG. 11B is a characteristic diagram illustrating a relationship between an incident angle and reflectance of the dichroic film in FIG. 11A.

FIG. 11A schematically illustrates angle characteristics of the dichroic film 13 in a case where the incident angle of the red light R is from a high angle to 90°. FIG. 11B illustrates a relationship between the incident angle and reflectance of the dichroic film 13 in FIG. 11A. In a case where the incident angle of the red light R is from a high angle to 90°, it is preferable that the dichroic film 13 reflect light in a range from the minimum incident angle (θmin>0°) to the maximum incident angle (θmax=90°) of the red light and totally transmit light out of the range from the minimum incident angle (θmin>0°) to the maximum incident angle (θmax=90°) of the red light R, for example, as illustrated in FIG. 11B. The fluorescent light FL outputted from the fluorescent light body layer 12 is outputted through the dichroic film 13 in the incident direction of the blue light B and the red light R outputted from the light source section 110, as illustrated in FIG. 11A, but the red component included in the fluorescent light FL is reflected within the range of the incident angle (from θmin to θmax) of the red light R, and is transmitted out of the range of the incident angle described above. In addition, although not illustrated, the blue light B is preferably totally transmitted.

Figure 12A:
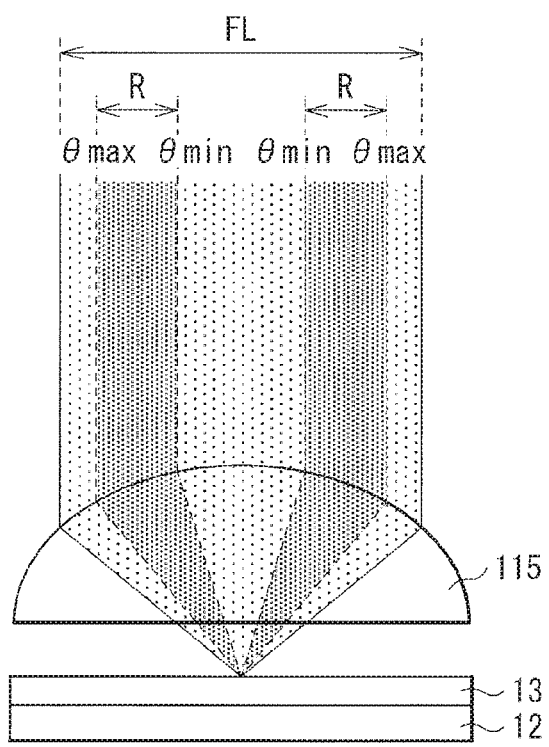
FIG. 12A is a schematic diagram describing another example of angle characteristics of the dichroic film in a case where the incident angle of the red light R is higher than 0° and lower than 90°.
Figure 12B:
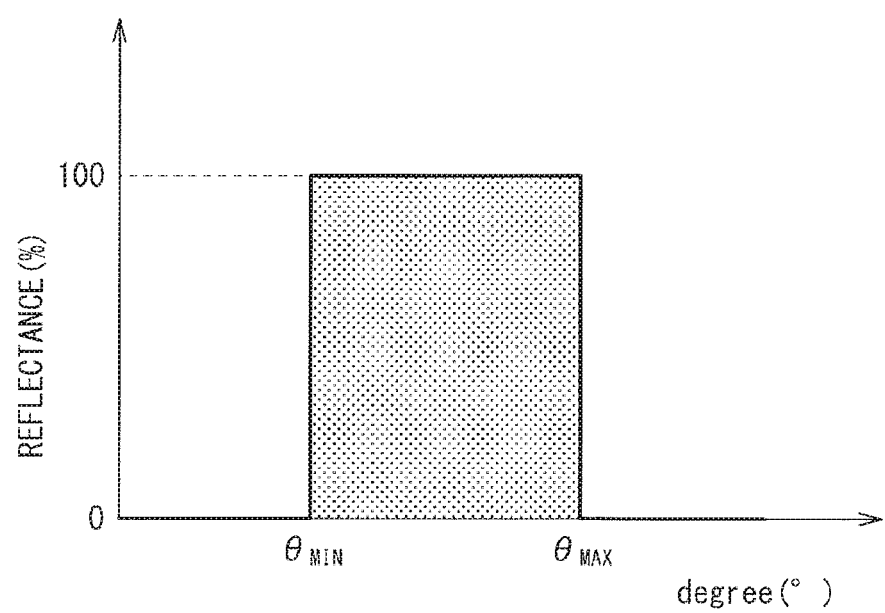
FIG. 12B is a characteristic diagram illustrating a relationship between an incident angle and reflectance of the dichroic film in FIG. 12A.

FIG. 12A schematically illustrates angle characteristics of the dichroic film 13 in a case where the incident angle of the red light R is higher than 0° and lower than 90°. FIG. 12B illustrates a relationship between the incident angle and reflectance of the dichroic film 13 in FIG. 12A. In a case where the incident angle of the red light R is higher than 0° and lower than 90°, it is preferable that the dichroic film 13 reflect light in a range from the minimum incident angle (θmin>0°) to the maximum incident angle (θmax<90°) of the red light R and totally transmit light out of the range from the minimum incident angle (θmin>0°) to the maximum incident angle (θmax<90°) of the red light R, for example, as illustrated in FIG. 12B. The fluorescent light FL outputted from the fluorescent light body layer 12 is outputted through the dichroic film 13 in the incident direction of the blue light B and the red light R outputted from the light source section 110, as illustrated in FIG. 12A, but the red component included in the fluorescent light FL is reflected within the range of the incident angle (from θmin to θmax) of the red light R, and is transmitted out of the range of the incident angle described above. In addition, although not illustrated, the blue light B is preferably totally transmitted.

The incident angle of the red light R is determined by the position of the semiconductor laser 111R in the light source section 110. In the light source device 100A according to the present embodiment, the dichroic film 13 having corresponding angle characteristics is disposed on the fluorescent light body layer 12 in accordance with the position of the semiconductor laser 111R, which makes it possible to selectively reflect the red light R. In addition, it is possible to combine the red light R and the red component included in the fluorescent light FL. This makes it possible to efficiently supplement light (red light R) in a wavelength range that is insufficient in the blue light B and the fluorescent light FL.

1-2. Configuration of Projector

Figure 13:
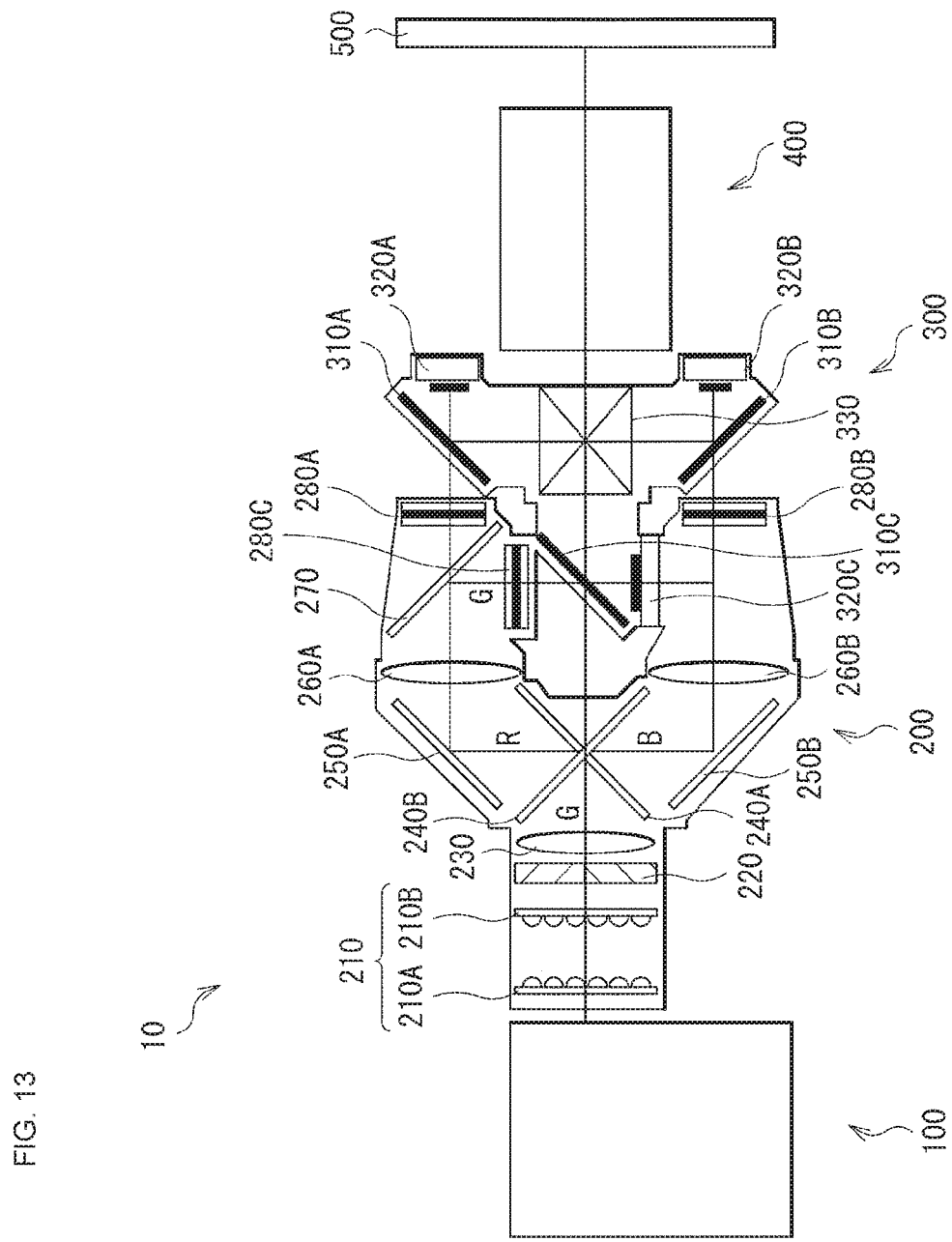
FIG. 13 is a schematic diagram illustrating a configuration example of a projector according to the present disclosure.
Figure 14:
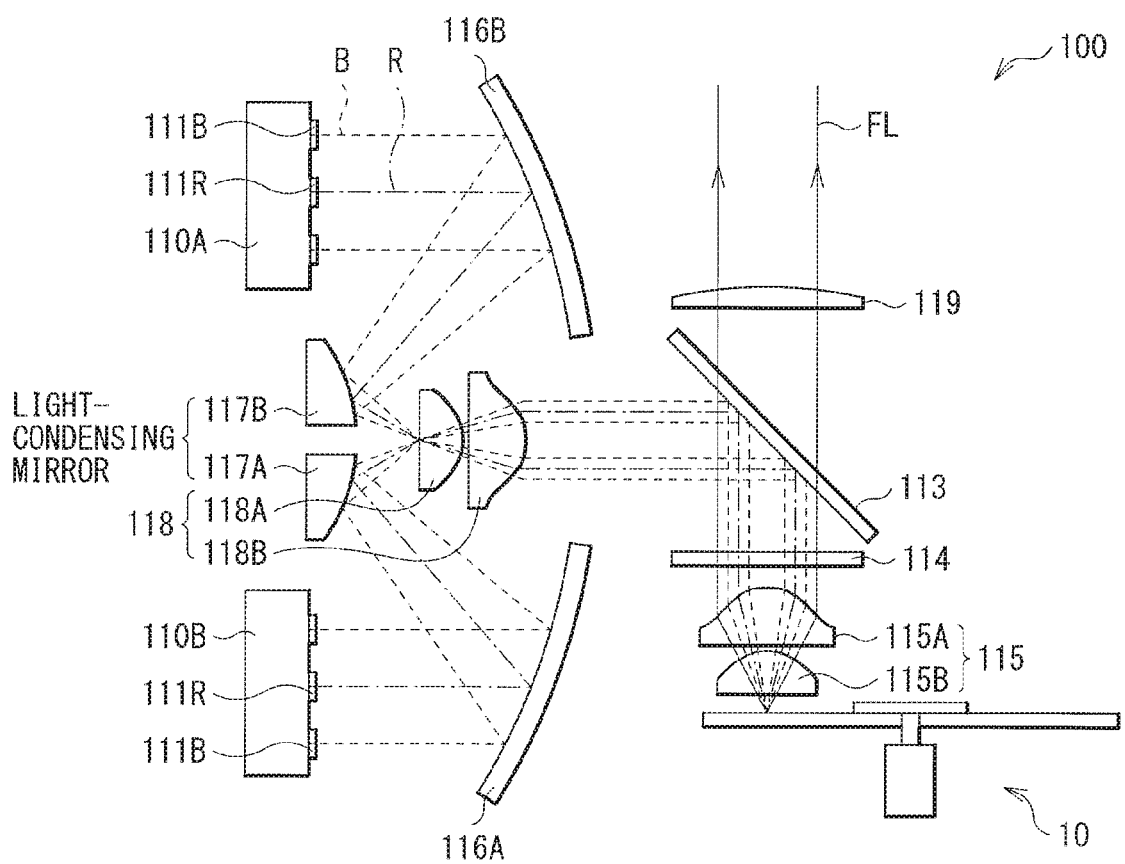
FIG. 14 is a schematic diagram illustrating an example of an entire configuration of a light source device illustrated in FIG. 13.

Next, description is given of a projection-type display apparatus (projector 1) according to the present disclosure. FIG. 13 is a schematic diagram illustrating an entire configuration of the projector 1. FIG. 14 illustrates an example of a specific entire configuration in a case where the light source device 100A is used as the light source device 100 of the projector 1. It should be noted that, in the following description, a reflective 3LCD-type projector that performs light modulation using a reflective liquid crystal panel (LCD) is given as an example. It should be noted that, instead of the reflective liquid crystal panel, the fluorescent light body wheel 10 may also be applied to a projector using a transmissive liquid crystal panel, a digital micro-mirror device (DMD: Digital Micro-mirror Device), or the like.

As illustrated in FIG. 13, the projector 1 includes the light source device 100, the illumination optical system 200, an image forming section 300, and a projecting optical system 400 (projection optical system) in order.

The light source device 100 includes the light source sections 110A and 110B each of which includes the plurality of semiconductor lasers 111B and 111R, light-condensing mirrors 116A, 116B, 117A, and 117B for concentrating, for example, the blue light B and the red light R outputted from the light source sections 110A and 110B, the dichroic mirror 113 that reflects, toward the fluorescent light body wheel 10, the blue light B and the red light R outputted from the light-condensing mirrors 117A and 117B, the λ/4 wave plate 114, the light-condensing lenses 115A and 115B that concentrate the blue light B and the red light R on the fluorescent light body wheel 10, and the fluorescent light body wheel 10. In addition, for example, a collimator lens 119 is disposed in an optical path of the fluorescent light FL outputted from the fluorescent light body wheel 10.

The illumination optical system 200 includes, for example, fly eye lenses 210 (210A and 210B), a polarization conversion element 220, a lens 230, dichroic mirrors 240A and 240B, reflecting mirrors 250A and 250B, lenses 260A and 260B, a dichroic mirror 270, and polarizing plates 280A to 280C, from a position closer to the light source device 100.

The fly eye lenses 210 (210A and 210B) are for achieving a uniform distribution of illumination of light outputted from the light source device 100. The polarization conversion element 220 functions to align a polarization axis of incident light with a predetermined direction. For example, light other than P-polarized light is converted into P-polarized light. The lens 230 concentrates light from the polarization conversion element 220 toward the dichroic mirrors 240A and 240B. Each of the dichroic mirrors 240A and 240B selectively reflects light in a predetermined wavelength range, and selectively transmits light in the other wavelength ranges. For example, the dichroic mirror 240A mainly reflects red light in a direction of the reflecting mirror 250A. In addition, the dichroic mirror 240B mainly reflects blue light in a direction of the reflecting mirror 250B. Thus, green light is mainly transmitted through both the dichroic mirrors 240A and 240B, and travels toward a reflective polarizing plate 310C (to be described later) of the image forming section 300. The reflecting mirror 250A reflects light (mainly red light) from the dichroic mirror 240A toward the lens 260A. The reflecting mirror 250B reflects light (mainly blue light) from the dichroic mirror 240B toward the lens 260B. The lens 260A transmits light (mainly red light) from the reflecting mirror 250A, and concentrates the light on the dichroic mirror 270. The lens 260B transmits light (mainly blue light) from the reflecting mirror 250B, and concentrates the light on the dichroic mirror 270. The dichroic mirror 270 selectively reflects green light and selectively transmits light in the other wavelength ranges. Here, the dichroic mirror 270 transmits a red light component of light from the lens 260A. In a case where the light from the lens 260A includes a green light component, the green light component is reflected toward the polarizing plate 280C. The polarizing plates 280A to 280C each include a polarizer having a polarization axis in a predetermined direction. For example, in a case of conversion into P-polarized light in the polarization conversion element 220, the polarizing plates 280A to 280C transmit P-polarized light, and reflect S-polarized light.

The image forming section 300 includes reflective polarizing plates 310A to 310C, reflective liquid crystal panels 320A to 320C (optical modulators), and a dichroic prism 330.

The reflective polarizing plates 310A to 310C respectively transmit light (for example, P-polarized light) having the same polarization axis as the polarization axis of polarized light from the polarizing plates 280A to 280C, and reflect light (S-polarized light) having any other polarization axis. Specifically, the reflective polarizing plate 310A transmits P-polarized red light from the polarizing plate 280A in a direction of the reflective liquid crystal panel 320A. The reflective polarizing plate 310B transmits P-polarized blue light from the polarizing plate 280B in a direction of the reflective liquid crystal panel 320B. The reflective polarizing plate 310C transmits P-polarized green light from the polarizing plate 280C in a direction of the reflective liquid crystal panel 320C. In addition, the P-polarized green light that has been transmitted through both the dichroic mirrors 240A and 240B and has entered the reflective polarizing plate 310C is transmitted through the reflective polarizing plate 310C as it is, and enters the dichroic prism 330. Further, the reflective polarizing plate 310A reflects S-polarized red light from the reflective liquid crystal panel 320A, and causes the S-polarized red light to enter the dichroic prism 330. The reflective polarizing plate 310B reflects S-polarized blue light from the reflective liquid crystal panel 320B, and causes the S-polarized blue light to enter the dichroic prism 330. The reflective polarizing plate 310C reflects S-polarized green light from the reflective liquid crystal panel 320C, and causes the S-polarized green light to enter the dichroic prism 330.

The reflective liquid crystal panels 320A to 320C respectively perform spatial modulation of red light, blue light, or green light.

The dichroic prism 330 combines red light, blue light, and green light that are incident thereon, and outputs thus-combined light toward the projecting optical system 400.

The projecting optical system 400 enlarges light outputted from the image forming section 300, and projects the light onto a screen 500 or the like.

(Operations of Light Source Device and Projector)

Next, description is given of an operation of the projector 1 including the light source device 100 with reference to FIG. 12 and FIG. 13.

First, in the light source device 100, the motor 14 is driven to rotate the fluorescent light body wheel 10. Thereafter, the blue light B and the red light R are outputted from the light source section 110 to the dichroic mirror 113 via the light-condensing mirrors 117A and 117B. The blue light B and the red light R are reflected by the dichroic mirror 113, and then are transmitted through the light-condensing lenses 115A and 115B in this order and are applied to the fluorescent light body wheel 10.

In the fluorescent light body wheel 10, the dichroic film 13 reflects the red light R and transmits the blue light B, and the fluorescent light body layer 12 absorbs a portion of the blue light B to convert the portion of the blue light B into light in a predetermined wavelength range (fluorescent light FL). A portion of the fluorescent light FL outputted in the fluorescent light body layer 12 is diffused together with a portion having not absorbed by the fluorescent light body layer 12 of the blue light B, reflected toward the light-condensing lens 115, and combined with the red light R in the dichroic film 13 to synthesize white light. The white light enters the illumination optical system 200 through the dichroic mirror 113 and the collimator lens 119.

White light incident from the light source device 100 is transmitted through the fly eye lenses 210 (210A and 210B), the polarization conversion element 220, and the lens 230 in order, and then reaches the dichroic mirrors 240A and 240B.

The dichroic mirror 240A mainly reflects the red light R, and the red light R is transmitted through the reflecting mirror 250A, the lens 260A, the dichroic mirror 270, the polarizing plate 280A, and the reflective polarizing plate 310A in order, and then reaches the reflective liquid crystal panel 320A. The red light R is subjected to spatial modulation in the reflective liquid crystal panel 320A, and then is reflected by the reflective polarizing plate 310A to enter the dichroic prism 330. It should be noted that in a case where light reflected toward the reflecting mirror 250A by the dichroic mirror 240A includes a green light component, the green light component is reflected by the dichroic mirror 270, and transmitted through the polarizing plate 280C and the reflective polarizing plate 310C in order to reach the reflective liquid crystal panel 320C. The blue light B is mainly reflected by dichroic mirror 240B to enter the dichroic prism 330 through a similar process. The green light G having been transmitted through the dichroic mirrors 240A and 240B also enters the dichroic prism 330.

The red light R, the blue light B, and the green light G having entered the dichroic prism 330 are combined, and thus-combined light is outputted as image light toward the projecting optical system 400. The projecting optical system 400 enlarges image light from the image forming section 300, and projects the image light onto a screen 500.

1-3. Workings and Effects

As described above, in recent years, a light source device for a projector uses a system in which a Ce-YAG fluorescent light body is excited to output fluorescent light and red light and green light are obtained from the fluorescent light. However, a color gamut in this system is as narrow as about 60% in the BT20202 standard. In addition, in a case where display is performed using D65 that is defined as a white point in the sRGB standard, a red light component of fluorescent light is rate-limiting.

Accordingly, there is disclosed a light source device in which balance of three reduced colors is improved by adding a laser that outputs light in the red wavelength range in an optical path aside from a laser in the blue wavelength range that is a light source for excitation of a fluorescent light body; however, in projectors, expansion of a color gamut is desired.

In contrast, in the present embodiment, a light condenser and the dichroic film 13 are disposed between the light source section 110 and the fluorescent light body wheel 10. The light source section 110 includes the plurality of semiconductor lasers 111B that oscillates the blue light B and the plurality of semiconductor lasers 111R that oscillates the red light R. The light condenser concentrates the blue light B and the red light R. The dichroic film 13 transmits the blue light B and reflects the red light R in accordance with incident angles, and combines the blue light B, the red light R, and the fluorescent light Fl outputted from the fluorescent light body layer 12.

Figure 15:
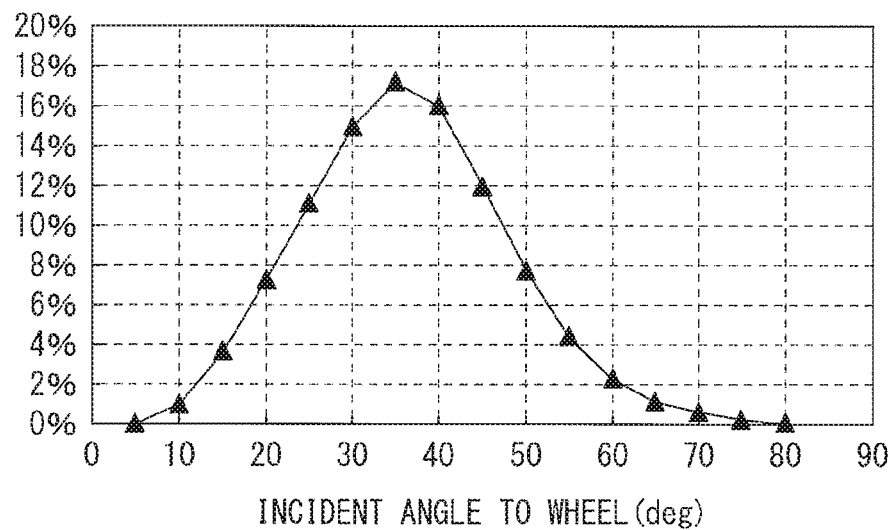
FIG. 15 is a characteristic diagram illustrating an incident angle distribution of red light to a fluorescent light body wheel in the light source device illustrated in FIG. 13.
Figure 16:
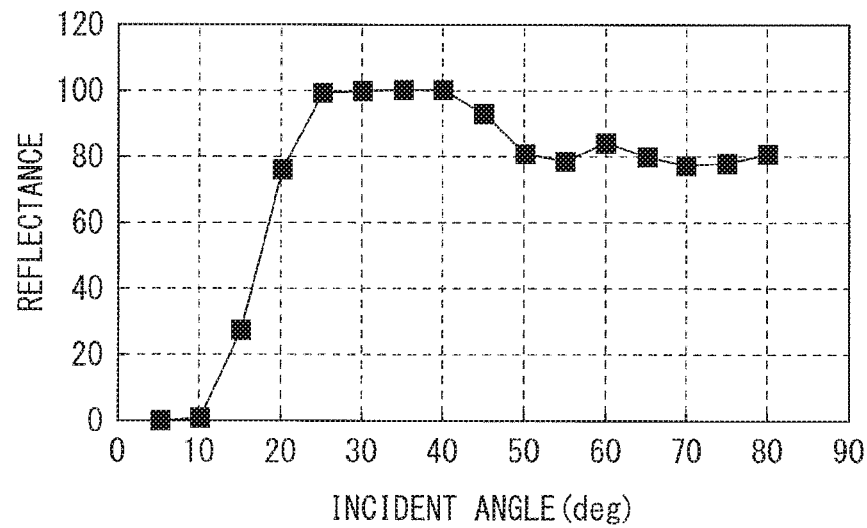
FIG. 16 is an angle characteristic diagram of a dichroic film with respect to the red light illustrated in FIG. 15.
Figure 17:
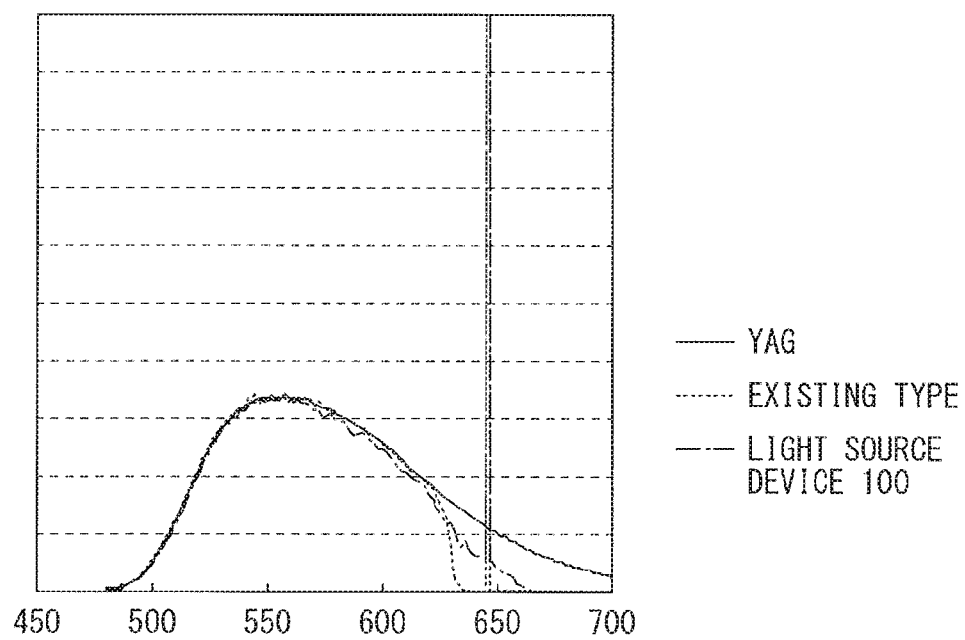
FIG. 17 is a spectral diagram of white light outputted from the light source device illustrated in FIG. 13.

FIG. 15 illustrates an incident angle distribution of the red light R to the fluorescent light body wheel 10 in the light source device 100. FIG. 16 illustrates angle characteristics of the dichroic film 13 in a case where the red light R has an incident angle distribution as illustrated in FIG. 15. In the dichroic film 13 having such angle characteristics, the red light R is reflected, and a portion of the red component included in the fluorescent light FL is transmitted. Accordingly, a spectrum of white light outputted from the light source device 100 has a shape as illustrated in FIG. 17, for example, and it is understood that a component in the red wavelength range is increased as compared with a spectrum of white light outputted from an existing type light source device.

Figure 18A:
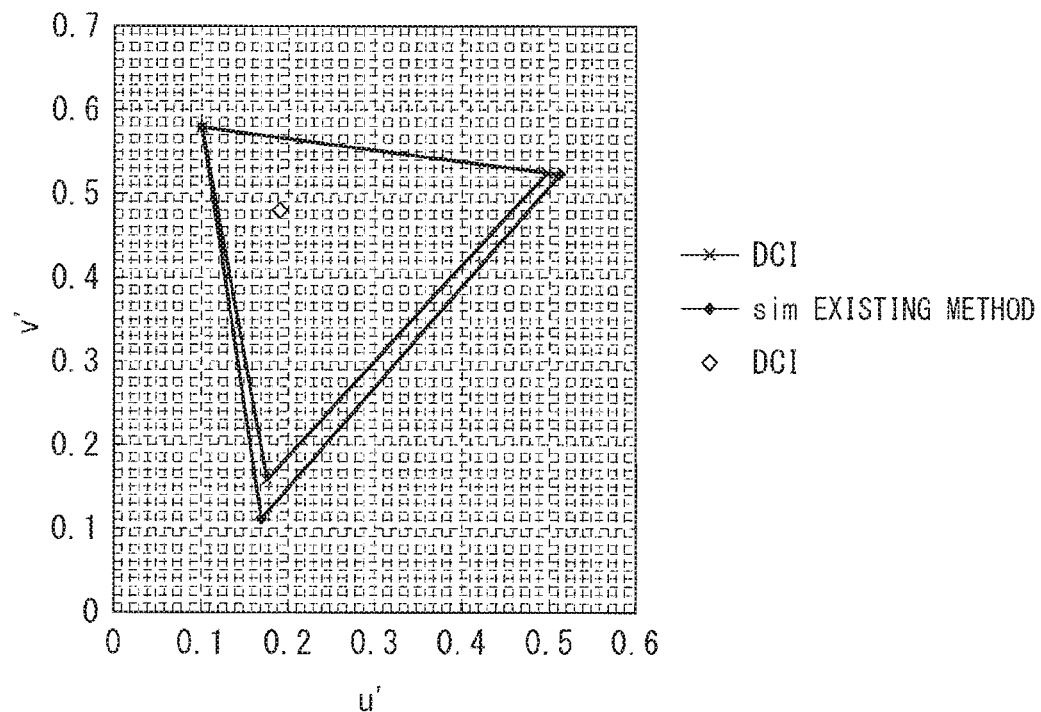
FIG. 18A is a color gamut diagram of light outputted from an existing type light source device.
Figure 18B:
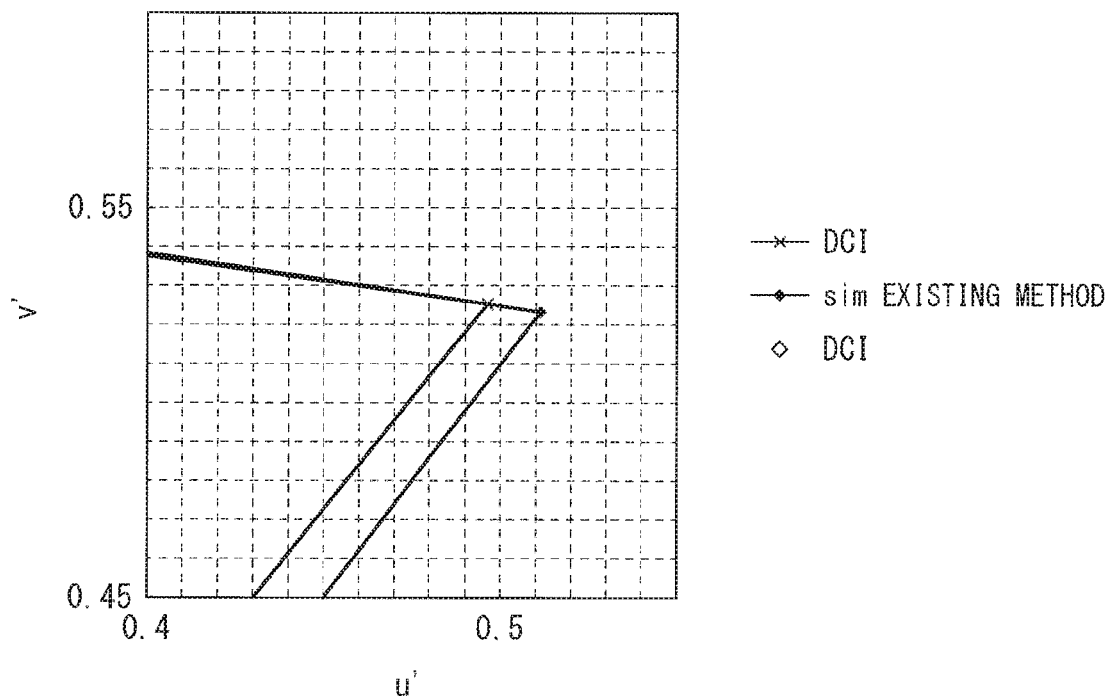
FIG. 18B is an enlarged diagram of the color gamut diagram illustrated in FIG. 18A.
Figure 19A:
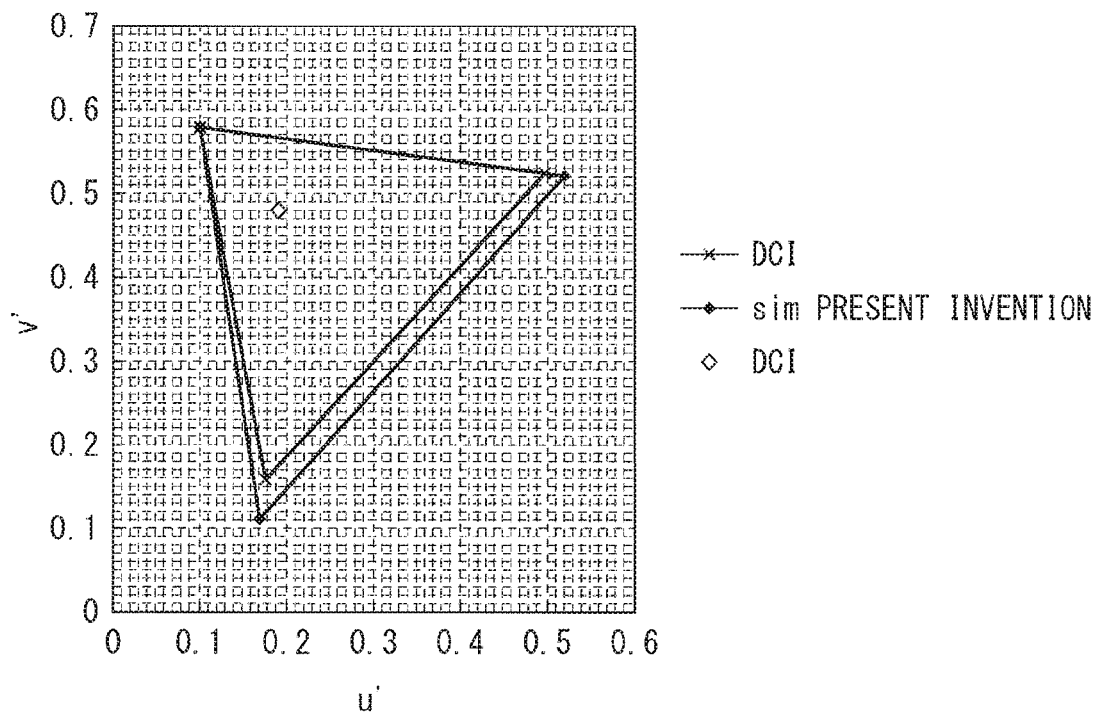
FIG. 19A is a color gamut diagram of light outputted from the light source device illustrated in FIG. 13.
Figure 19B:
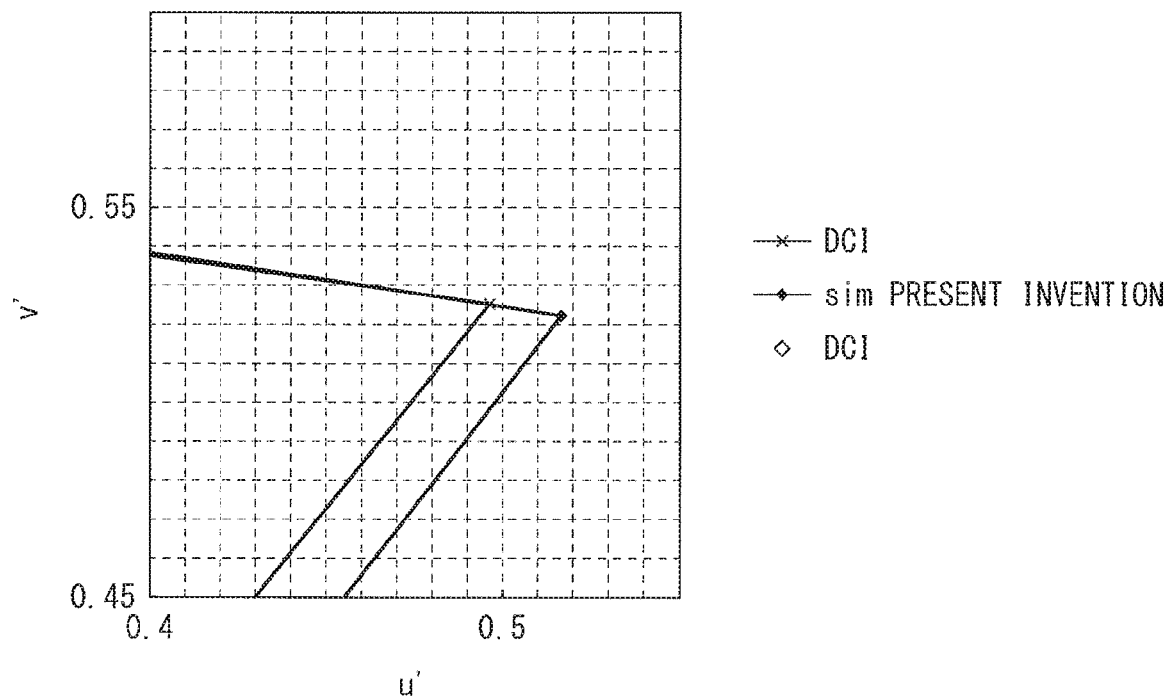
FIG. 19B is an enlarged diagram of the color gamut diagram illustrated in FIG. 19A.

FIG. 18A is a color gamut diagram of white light outputted from an existing type light source device, and FIG. 18B is an enlarged view of a red region in the color gamut diagram illustrated in FIG. 18A. FIG. 19A is a color gamut diagram of white light outputted from the light source device 100 according to the present embodiment, and FIG. 19B is an enlarged view of a red region in the color gamut diagram illustrated in FIG. 19A. It is understood from a comparison between FIGS. 18A and 18B and FIGS. 19A and 19B that in the light source device 100 according to the present embodiment, a color gamut is expanded more than that in the existing type light source device.

As described above, in the light source device 100A according to the present embodiment, the light condenser and the dichroic film 13 are disposed between the light source section 110 and the reflective fluorescent light body wheel 10. The light source section 110 includes the plurality of semiconductor lasers 111B that oscillates the blue light B and the plurality of semiconductor lasers 111R that oscillates the red light R. The light condenser concentrates the blue light B and the red light R. The dichroic film 13 transmits the blue light B and reflects the red light R in accordance with the incident angles, and combines the blue light B, the red light R, and the fluorescent light Fl outputted from the fluorescent light body layer 12. This makes it possible to efficiently use, as light in a wavelength range that is insufficient in the blue light B and the fluorescent light FL, the red light R outputted from the semiconductor laser 11R used as alight source for supplemental light. Accordingly, it is possible to expand the color gamut of white light outputted from the light source device 100A.

In addition, the dichroic film 13 according to the present embodiment transmits a portion of the red component included in the fluorescent light FL, which makes it possible to superimpose the red component of the fluorescent light FL on the wavelength range of the red light R outputted from the semiconductor laser 111R, thereby expanding a color gamut in the red wavelength range. This makes it possible to reduce speckle noise resulting from use of the semiconductor lasers 111R as the light source for supplemental light.

Further, in the present embodiment, the semiconductor laser 111R that is the light source for supplemental light is disposed together with the semiconductor laser 111B that is a light source for excitation in one light source section 110, which makes it possible to downsize the light source device 100A.

Next, description is given of a second embodiment and modification examples 1 to 3. In the following, components similar to those in the first embodiment described above are denoted by the same reference numerals, and description thereof is omitted as appropriate.

2. Second Embodiment

Figure 20:
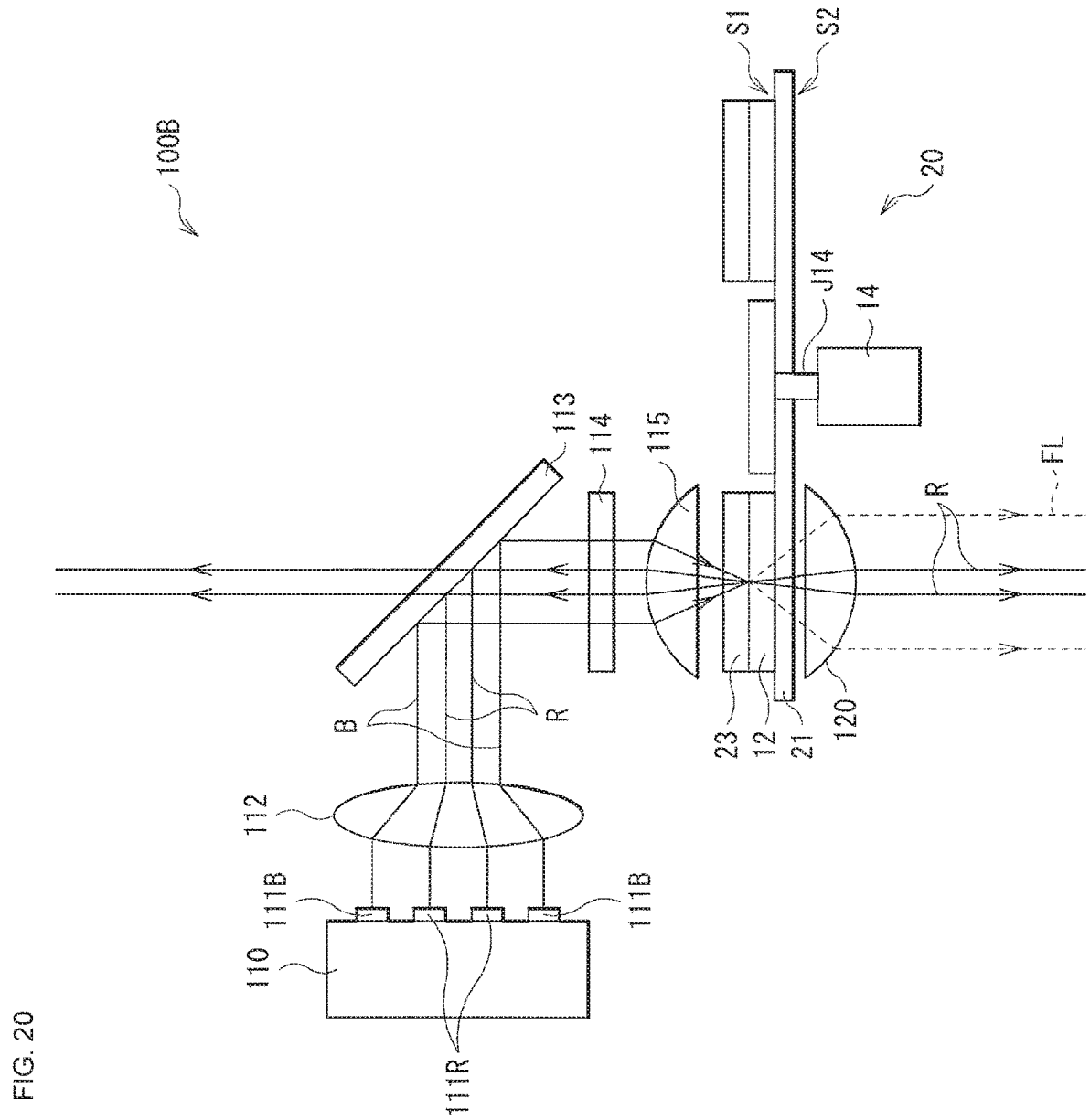
FIG. 20 is a schematic diagram illustrating an example of a configuration of a light source device according to a second embodiment of the present disclosure.

FIG. 20 schematically illustrates an example of a configuration of a light source device (light source device 100B) according to a second embodiment of the present disclosure. The light source device 100B is used as the light source device 100 of the projection-type display apparatus (projector 1) described above. The light source device 100B according to the present embodiment differs from that in the first embodiment described above in that a transmissive fluorescent light body wheel 20 is used as a wavelength converter.

2-1. Configuration of Light Source Device

The light source device 100B includes the light source section 110, the lens 112, the dichroic mirror 113, the light-condensing lens 115, the fluorescent light body wheel 20, and a lens 120. The fluorescent light body wheel 20 is a transmissive wavelength conversion element as described above, and is rotatably supported by the shaft J14. Respective members included in the light source device 100B are disposed in an optical path of light outputted from the light source section 110 in order of the lens 112, the dichroic mirror 113, the light-condensing lens 115, and the fluorescent light body wheel 10, and the lens 120.

The supporting substrate 21 includes a material having light transmissivity as with the cover glass 15 described above, and has a property of transmitting the blue light B, at least a portion of the red light R, and the fluorescent light FL toward the surface S2. Examples of a material included in the supporting substrate 21 include quartz, glass, sapphire, crystal, and the like. Of these materials, sapphire having high thermal conductivity is preferably used. In addition to these materials, it is possible to use a resin material such as polyethylene terephthalate (PET) and a silicone resin in a case where the light source device 100 uses a light source with a low output.

Figure 21:
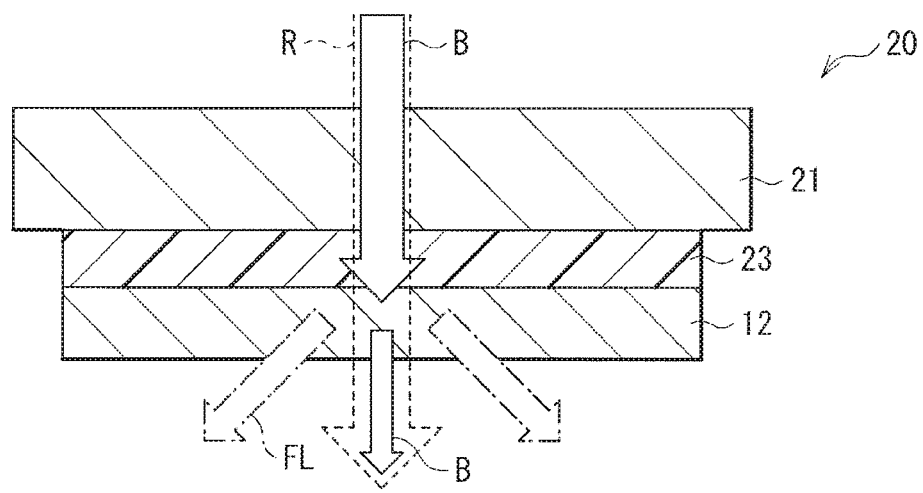
FIG. 21 is a schematic plan view of an example of a configuration of a fluorescent light body wheel illustrated in FIG. 20.

It should be noted that the transmissive fluorescent light body wheel 20 may have a configuration in which the fluorescent light body layer 12 and the dichroic film 23 are provided in this order on the surface S1 side of the supporting substrate 21, as with the reflective fluorescent light body wheel 10, or may have a configuration in which the dichroic film 23 and the fluorescent light body layer 12 are provided in this order on the surface S2 side of the supporting substrate 21, for example, as illustrated in FIG. 21.

The dichroic film 23 according to the present embodiment transmits at least a portion of the red light R outputted from the light source section 110 and the blue light B outputted from the light source section 110, and reflects the fluorescent light FL outputted from the fluorescent light body layer 12, and combines the blue light B, the red light R, and the fluorescent light FL. Transmission of the red light R and the blue light B is selected by incident angles of the red light R and the blue light B to the dichroic film 23.

Figure 22A:
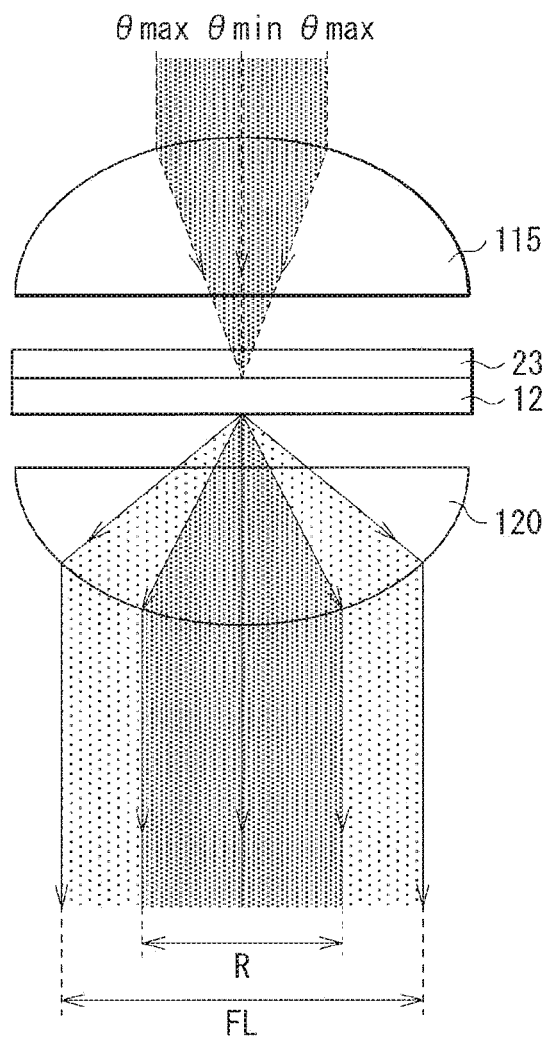
FIG. 22A is a schematic diagram describing an example of angle characteristics of a dichroic film in a case where the incident angle of the red light R is from 0° to a low angle.
Figure 22B:
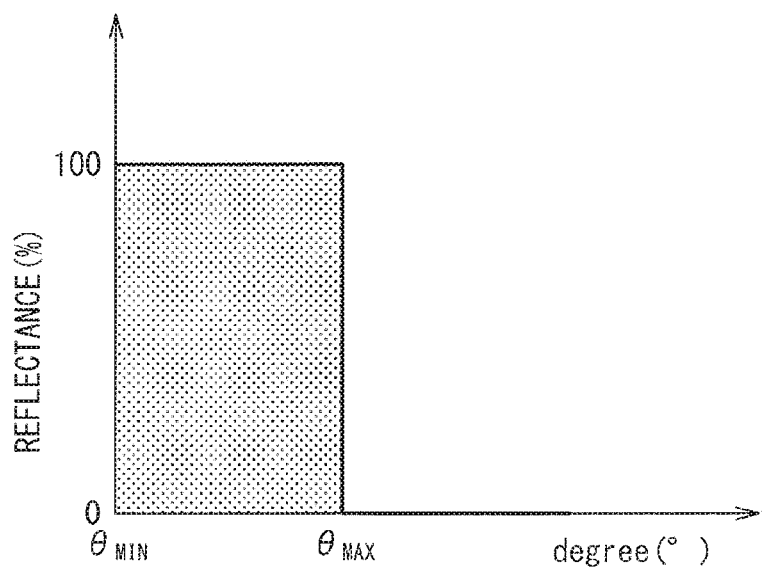
FIG. 22B is a characteristic diagram illustrating a relationship between an incident angle and reflectance of the dichroic film in FIG. 22A.

FIG. 22A schematically illustrates angle characteristics of the dichroic film 23 in a case where the incident angle of the red light R is form 0° to a low angle. FIG. 22B illustrates a relationship between the incident angle and reflectance of the dichroic film 23 in FIG. 22A. In a case where the incident angle of the red light R is from 0° to a low angle, it is preferable that the dichroic film 23 transmit light in a range from a minimum incident angle ($\theta$min=0°) to a maximum incident angle ($\theta$max<90°) of the red light R, and reflects light out of the range from the minimum incident angle ($\theta$min=0°) to the maximum incident angle ($\theta$max<90°) of the red light R, for example, as illustrated in FIG. 22B. It should be noted that a red component of the fluorescent light FL outputted from the fluorescent light body layer 12 toward the dichroic film 23 is transmitted within the range of the incident angle (from $\theta$min to $\theta$max) of the red light R, and is reflected out of the range of the incident angle described above. In addition, although not illustrated, the blue light B is preferably totally transmitted, and blue light that has not been converted in the fluorescent light body layer 12 is transmitted as it is toward the lens 120.

Figure 23A:
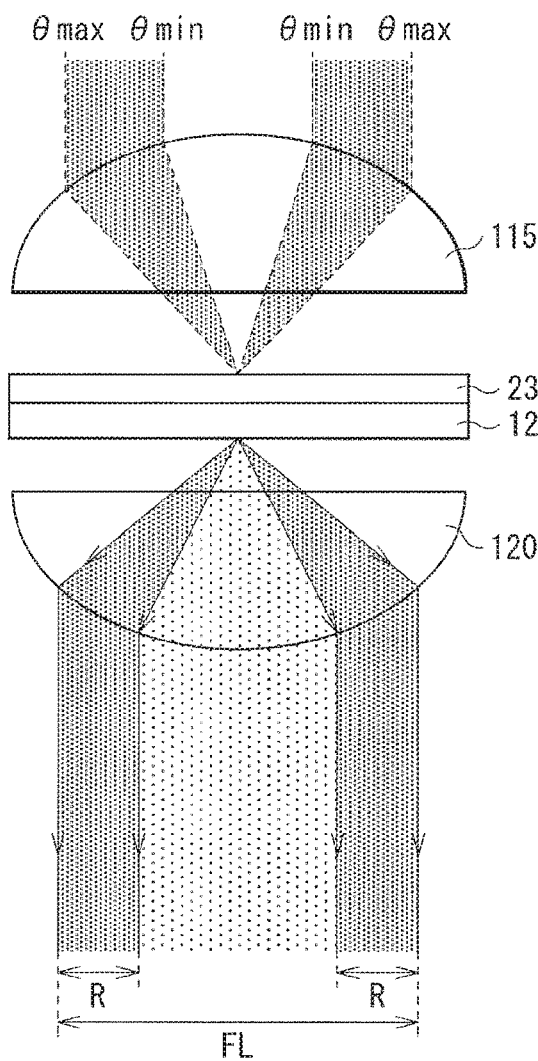
FIG. 23A is a schematic diagram describing another example of angle characteristics of the dichroic film in a case where the incident angle of the red light R is from a high angle to 90°.
Figure 23B:
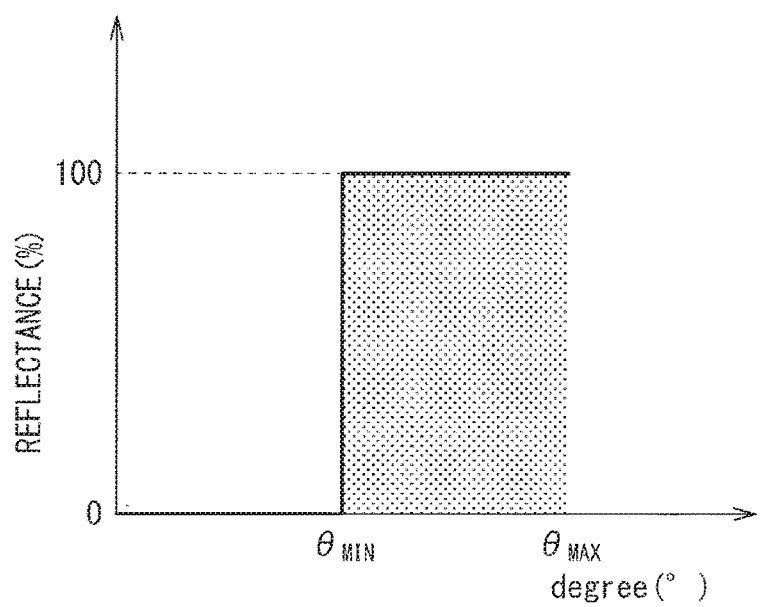
FIG. 23B is a characteristic diagram illustrating a relationship between an incident angle and reflectance of the dichroic film in FIG. 23A.

FIG. 23A schematically illustrates angle characteristics of the dichroic film 23 in a case where the incident angle of the red light R is from a high angle to 90°. FIG. 23B illustrates a relationship between the incident angle and reflectance of the dichroic film 23 in FIG. 23A. In a case where the incident angle of the red light R is from a high angle to 90°, it is preferable that the dichroic film 23 transmit light in a range from the minimum incident angle ($\theta$min>0°) to the maximum incident angle ($\theta$max=90°) of the red light R, and totally reflect light out of the range from the minimum incident angle ($\theta$min>0°) to the maximum incident angle ($\theta$max=90°) of the red light R, for example, as illustrated in FIG. 23B. It should be noted that the red component of the fluorescent light FL outputted from the fluorescent light body layer 12 toward the dichroic film 23 is transmitted within the range of the incident angle (from $\theta$min to $\theta$max) of the red light R, and is reflected out of the range of the incident angle described above. In addition, although not illustrated, the blue light B is preferably totally transmitted, and blue light that has not been converted in the fluorescent light body layer 12 is transmitted as it is toward the lens 120.

Figure 24A:
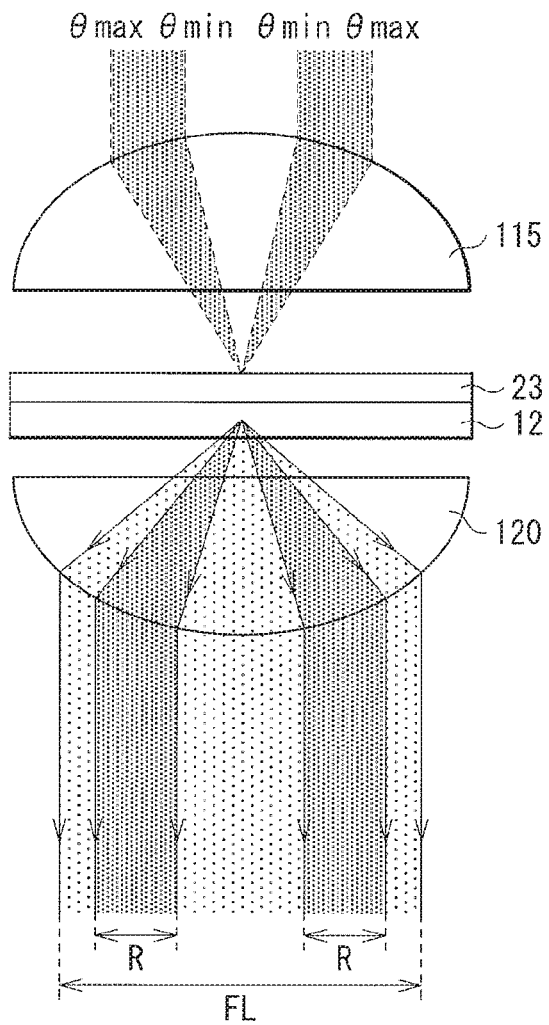
FIG. 24A is a schematic diagram describing another example of angle characteristics of the dichroic film in a case where the incident angle of the red light R is higher than 0° and lower than 90°.
Figure 24B:
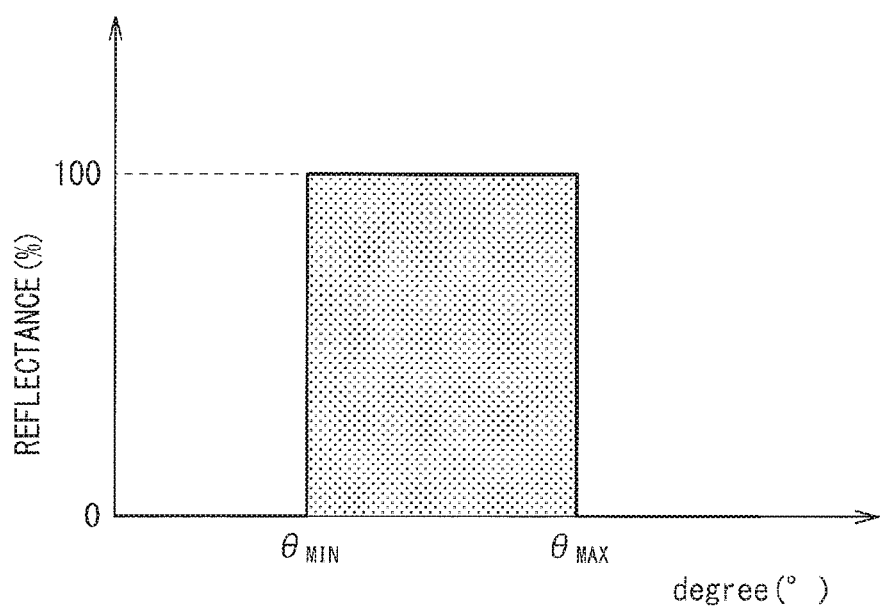
FIG. 24B is a characteristic diagram illustrating a relationship between an incident angle and reflectance of the dichroic film in FIG. 24A.

FIG. 24A schematically illustrates angle characteristics of the dichroic film 23 in a case where the incident angle of the red light R is higher than 0° and lower than 90°. FIG. 24B illustrates a relationship between the incident angle and reflectance of the dichroic film 23 in FIG. 24A. In a case where the incident angle of the red light R is higher than 0° and lower than 90°, it is preferable that the dichroic film 23 transmit light in a range from the minimum incident angle ($\theta$min>0°) to the maximum incident angle ($\theta$max<90°) of the red light R and totally reflect light out of the range from the minimum incident angle ($\theta$min>0°) to the maximum incident angle ($\theta$max<90°) of the red light R, for example, as illustrated in FIG. 24B. It should be noted that the red component of the fluorescent light FL is transmitted within the range of the incident angle (from $\theta$min to $\theta$max) of the red light R, and is reflected out of the range of the incident angle described above. In addition, although not illustrated, the blue light B is preferably totally transmitted, and blue light that has not been converted in the fluorescent light body layer 12 is transmitted as it is toward the lens 120.

The incident angle of the red light R is determined by the position of the semiconductor laser 111R in the light source section 110. In the light source device 100A according to the present embodiment, the dichroic film 23 having corresponding angle characteristics is disposed on the fluorescent light body layer 12 in accordance with the position of the semiconductor laser 111R, which makes it possible to selectively transmit the red light R. This makes it possible to efficiently supplement light (red light R) in a wavelength range that is insufficient in the blue light B and the fluorescent light FL.

Figure 25:
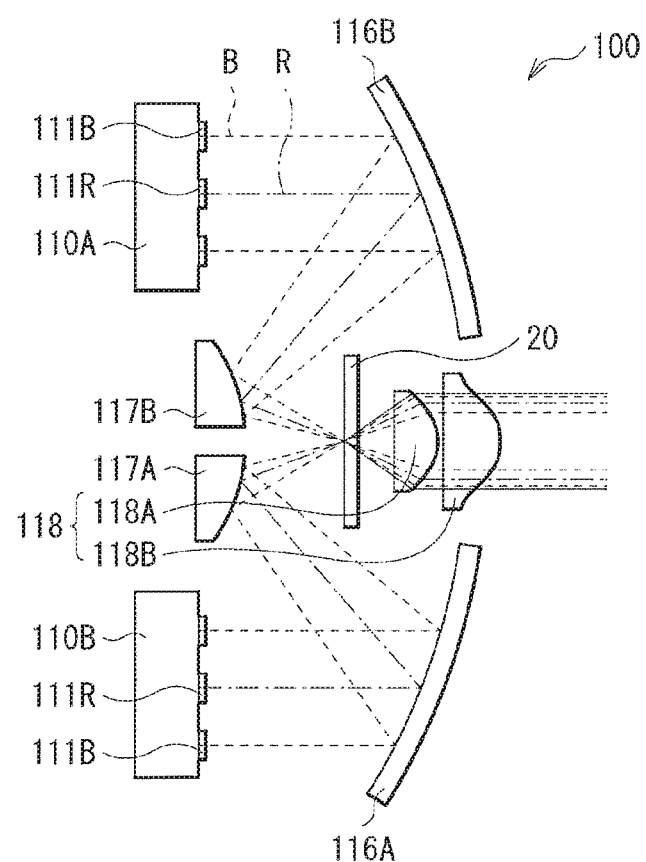
FIG. 25 is a schematic diagram illustrating an example of an entire configuration of the light source device illustrated in FIG. 13.

FIG. 25 illustrates an example of a specific entire configuration in a case where the light source device 100B illustrated in FIG. 20 is used as the light source device 100 of the projector 1. The light source device 100 includes the light source sections 110A and 110B each of which includes the plurality of semiconductor lasers 111B and 111R, the light-condensing mirrors 116A and 116B for concentrating, for example, the blue light B and the red light R outputted from the light source sections 110A and 110B, the light-condensing mirrors 117A and 117B that concentrate the blue light B and the red light R reflected by the light-condensing mirrors 116A and 116B on the fluorescent light body wheel 20, the fluorescent light body wheel 20, and a lens group 118 (lenses 18A and 118B) that diffuses the blue light B and the red light R transmitted through the fluorescent light body wheel 20 and the fluorescent light FL outputted from the fluorescent light body wheel 20 in this order. It should be noted that in the light source device 100, the light-condensing lens 115 illustrated in FIG. 20 corresponds to the light-condensing mirrors 117A and 117B.

2-2. Workings and Effects

As described above, in the light source device 100B according to the present embodiment, a light condenser and the dichroic film 23 are disposed between the light source section 110 and the transmissive fluorescent light body wheel 20. The light source section 110 includes the plurality of semiconductor lasers 111B that oscillates the blue light B and the plurality of semiconductor lasers 11R that oscillates the red light R. The light condenser concentrates the blue light B and the red light R. The dichroic film 23 transmits the blue light B and a portion of the red light R in accordance with the incident angles, and combines the blue light B, the red light R, and the fluorescent light Fl outputted from the fluorescent light body layer 12. This makes it possible to efficiently use, as light in a wavelength range that is insufficient in the blue light B and the fluorescent light FL, the red light R outputted from the semiconductor laser 111R used as a light source for supplemental light. Accordingly, it is possible to expand a color gamut of white light outputted from the light source device 100B.

3. Modification Examples

3-1. Modification Example 1

Figure 26:
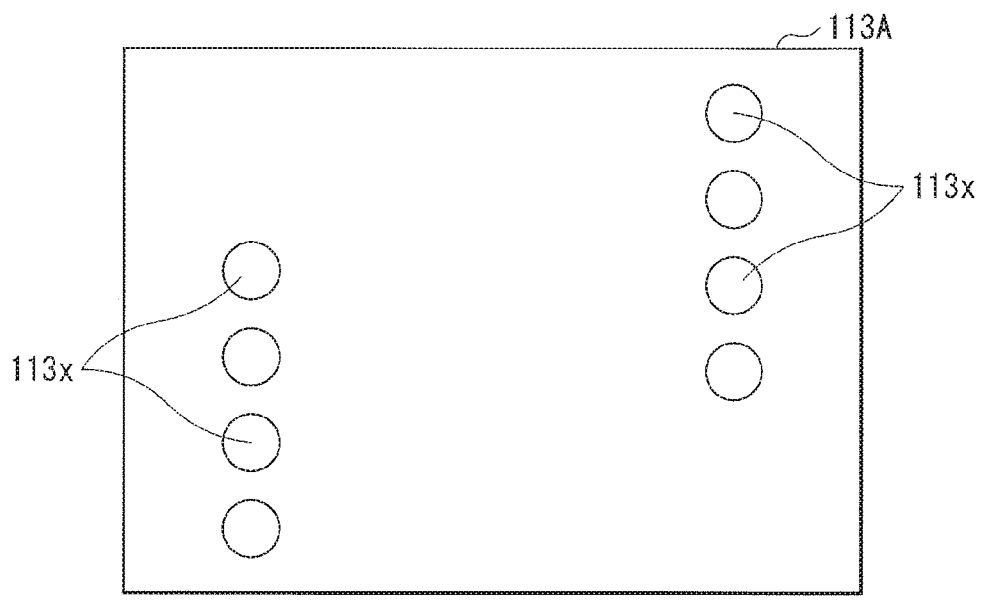
FIG. 26 is a schematic plan view of a configuration of a dichroic film according to a modification example 1 of the present disclosure.

FIG. 26 schematically illustrates a planar configuration of a dichroic mirror 13A according to a modification example 1 of the present disclosure. The dichroic mirror 113A reflects the blue light B and the red light R outputted from the light source section 110 and transmits the red light R and the fluorescent light FL incident from the fluorescent light body wheel 10 side, for example. The dichroic mirror 113 used in the first and second embodiments described above performs separation into reflection (S-polarized light) and transmission (P-polarized light) by polarization of the red light R. In contrast, the dichroic mirror 113A according to the present modification example has a region 113x, which reflects the red light R, only in a range where the red light R outputted from the light source section 110 enters. Accordingly, reflection and transmission are separated in accordance with a position where the red light R enters.

3-2. Modification Example 2

Figure 27:
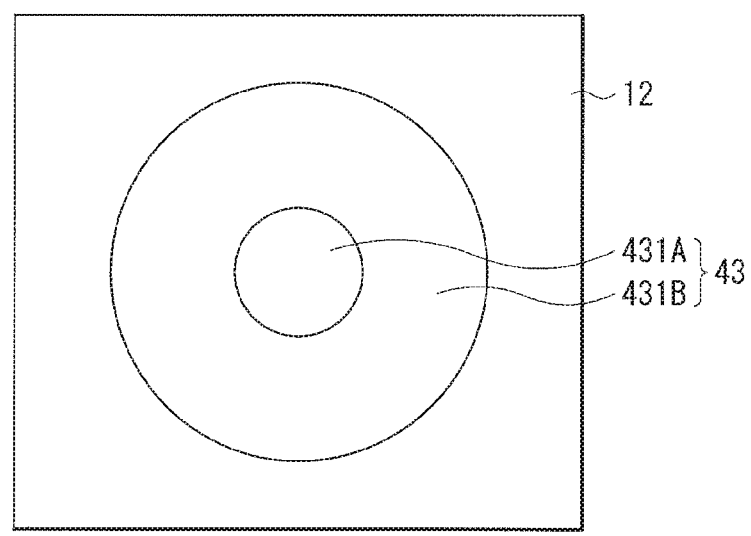
FIG. 27 is a schematic plan view of an example of a configuration of a dichroic film according to a modification example 2 of the present disclosure.
Figure 28:
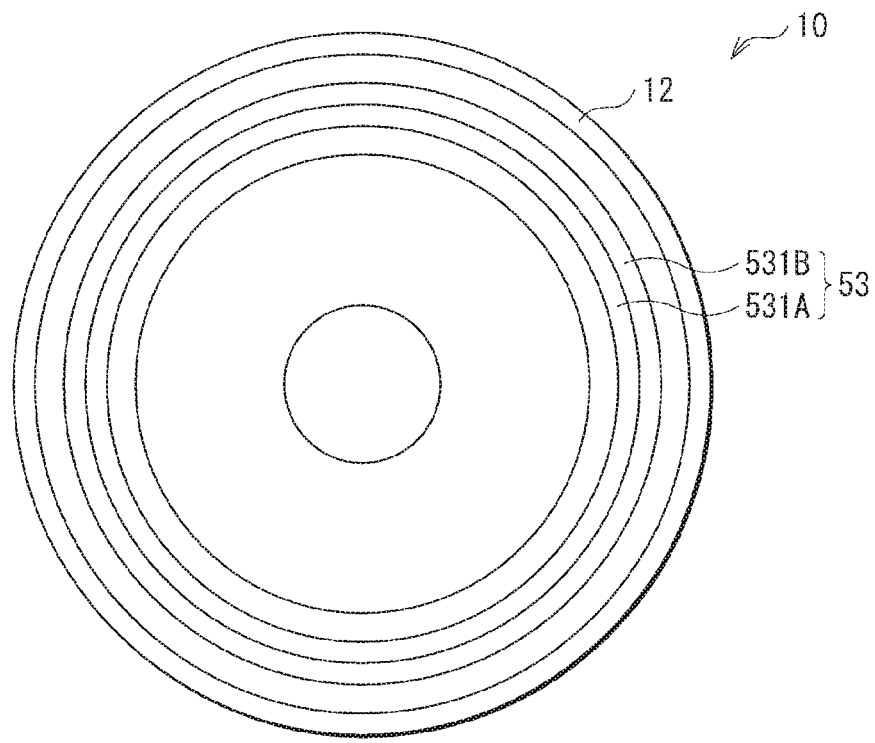
FIG. 28 is a schematic plan view of another example of the configuration of the dichroic film according to the modification example 2 of the present disclosure.

FIG. 27 schematically illustrates an example of a planar configuration of a dichroic film (dichroic film 42) according to a modification example 2 of the present disclosure. FIG. 28 schematically illustrates another example of a planar configuration of a dichroic film (dichroic film 52) according to the modification example 2 of the present disclosure. The dichroic films 43 and 53 according to the present modification example each transmit the blue light B and reflect the fluorescent light FL, for example, and respectively have regions 431A and 531A, which selectively reflect the red light R, only at positions where red light of the fluorescent light body layer 12 is concentrated.

3-3. Modification Example 3

Figure 29:
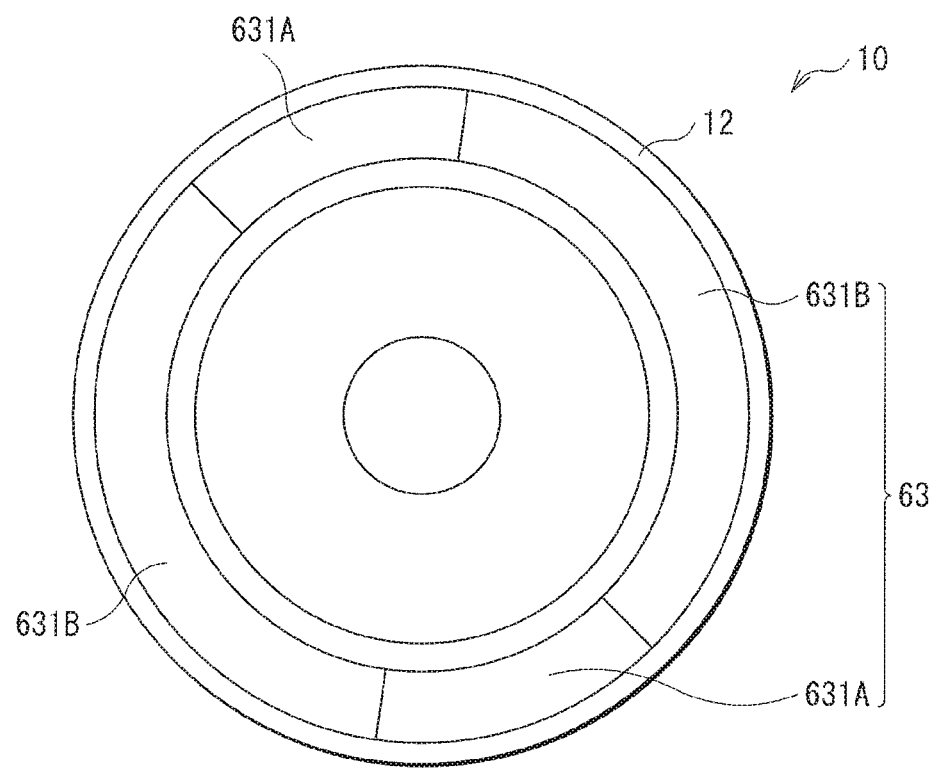
FIG. 29 is a schematic plan view of a configuration of a dichroic film according to a modification example 3 of the present disclosure.

FIG. 29 schematically illustrates a planar configuration of a dichroic film (dichroic film 62) according to a modification example 3 of the present disclosure. The dichroic film 63 according to the present modification example has, for example, a region 631A and a region 631B that are separately coated in a time-divisional manner on the fluorescent light body layer 12 that rotates, for example. The region 631A transmits the blue light B and the fluorescent light FL, and the region 631B reflects the red light R and the fluorescent light FL and transmits the blue light B.

Even with a configuration as described above, it is possible to combine the red light R outputted from the light source section 110 and the red component included in the fluorescent light FL, which makes it possible to efficiently supplement light (red light R) in a wavelength range that is insufficient in the blue light B and the fluorescent light FL.

Although the present disclosure has been described above with reference to the first and second embodiments and the modification examples 1 to 3, the present disclosure is not limited to the embodiment and the like described above, and may be modified in a variety of ways. For example, an apparatus other than the projector described above may be configured as the projection-type display apparatus according to the present disclosure. For example, in the first embodiment described above, a reflective 3LCD-type projector using a reflective liquid crystal panel as an optical modulator has been mentioned for description, but this is not limitative. The present technology is also applicable to a so-called transmissive 3LCD-type projector using a transmissive liquid crystal panel.

Further, in the present technology, the light source device according to the present technology may be used for an apparatus other than the projection-type display apparatus. For example, the light source device 100 according to the present disclosure may be used for illumination applications, and is applicable to a headlamp for automobile and a light source for lighting up.

It should be noted that the present technology may have the following configurations.

(1)

A light source device including:

a light source section including a first light source outputting light in a first wavelength range and a second light source outputting light in a second wavelength range in a same direction as the light in the first wavelength range, the second wavelength range being different from the first wavelength range;

a wavelength converter that is excited by the light in the first wavelength range to output fluorescent light;

a light condenser that concentrates the light in the first wavelength range and the light in the second wavelength range on the wavelength converter; and a multiplexer that has wavelength selectivity in which the light in the first wavelength range is transmitted and at least a portion of the light in the second wavelength range is reflected or transmitted in accordance with incident angles of the light in the first wavelength range and the light in the second wavelength range, and combines the light in the first wavelength range, the light in the second wavelength range, and the fluorescent light.

(2)

The light source device according to (1), in which in a case where the light in the second wavelength range is reflected, the multiplexer transmits a light component in the second wavelength range included in the fluorescent light, an incident angle of the light component being other than the incident angle of the light in the second wavelength range.

(3)

The light source device according to (1), in which in a case where the light in the second wavelength range is transmitted, the multiplexer reflects a light component in the second wavelength range included in the fluorescent light, an incident angle of the light component being other than the incident angle of the light in the second wavelength range.

(4)

The light source device according to any one of (1) to (3), in which the light in the first wavelength range, the light in the second wavelength range, and the fluorescent light are combined on a same axis.

(5)

The light source device according to any one of (1) to (4), in which the wavelength converter includes a supporting substrate and a fluorescent light body layer, the supporting substrate being rotatable around a rotating axis, and the light fluorescent light body layer including a plurality of fluorescent light body particles on the supporting substrate.

(6)

The light source device according to any one of (1) to (5), in which the multiplexer is disposed between the wavelength converter and the light condenser.

(7)

The light source device according to any one of (1) to (6), in which the multiplexer includes a dichroic film.

(8)

The light source device according to any one of (1) to (7), in which the first light source and the second light source respectively include a plurality of first light-emitting elements and a plurality of second light-emitting elements, and in the light source section, the plurality of first light-emitting elements and the plurality of second light-emitting elements are disposed to locate a center of XY coordinates of the plurality of second light-emitting elements at (0, 0).

(9)

The light source device according to any one of (1) to (8), in which the first wavelength range includes a blue wavelength range.

(10)

The light source device according to any one of (1) to (9), in which the second wavelength range includes a red wavelength range.

(11)

The light source device according to any one of (5) to (10), in which the supporting substrate has light reflectivity or light transmissivity.

(12)

The light source device according to any one of (5) to (11), in which the fluorescent light body layer is continuously formed in a rotation circumferential direction of the supporting substrate.

(13)

The light source device according to any one of (5) to (12), in which the fluorescent light body layer includes the plurality of fluorescent light body particles with which space between the supporting substrate and a counter substrate having light transmissivity is filled.

(14)

The light source device according to any one of (5) to (12), in which the fluorescent light body layer includes a ceramic fluorescent light body.

(15)

A projection-type display including:

a light source device;

an optical modulator that modulates light outputted from the light source device; and a projection optical system that projects the light from the optical modulator, the light source device including a light source section including a first light source outputting light in a first wavelength range and a second light source outputting light in a second wavelength range in a same direction as the light in the first wavelength range, the second wavelength range being different from the first wavelength range, a wavelength converter that is excited by the light in the first wavelength range to output fluorescent light, a light condenser that concentrates the light in the first wavelength range and the light in the second wavelength range on the wavelength converter, and a multiplexer that has wavelength selectivity in which the light in the first wavelength range is transmitted and at least a portion of the light in the second wavelength range is reflected or transmitted in accordance with incident angles of the light in the first wavelength range and the light in the second wavelength range, and combines the light in the first wavelength range, the light in the second wavelength range, and the fluorescent light.

This application claims the priority on the basis of Japanese Patent Application No. 2018-007191 filed with Japan Patent Office on Jan. 19, 2018, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A light source device, comprising:
a light source section including a first light source outputting light in a first wavelength range and a second light source outputting light in a second wavelength range in a same direction as the light in the first wavelength range, the second wavelength range being different from the first wavelength range;
a wavelength converter that is excited by the light in the first wavelength range to output fluorescent light;
a light condenser that concentrates the light in the first wavelength range and the light in the second wavelength range on the wavelength converter; and
a multiplexer that has wavelength selectivity in which the light in the first wavelength range is transmitted and at least a portion of the light in the second wavelength range is reflected or transmitted in accordance with incident angles of the light in the first wavelength range and the light in the second wavelength range, and combines the light in the first wavelength range, the light in the second wavelength range, and the fluorescent light,
wherein at least a portion of the light in the second wavelength range that is within a first range of incident angles is reflected by the multiplexer,
wherein the multiplexer transmits a light component in the second wavelength range included in the fluorescent light, and
wherein an incident angle of the light component in the second wavelength range that is transmitted by the multiplexer is outside of the first range of incident angles.

2. The light source device according to claim 1, wherein the light in the first wavelength range, the light in the second wavelength range, and the fluorescent light are combined on a same axis.

3. The light source device according to claim 1, wherein the wavelength converter includes a supporting substrate and a fluorescent light body layer, the supporting substrate being rotatable around a rotating axis, and the light fluorescent light body layer including a plurality of fluorescent light body particles on the supporting substrate.

4. The light source device according to claim 3, wherein the supporting substrate has light reflectivity or light transmissivity.

5. The light source device according to claim 3, wherein the fluorescent light body layer is continuously formed in a rotation circumferential direction of the supporting substrate.

6. The light source device according to claim 3, wherein the fluorescent light body layer includes the plurality of fluorescent light body particles with which space between the supporting substrate and a counter substrate having light transmissivity is filled.

7. The light source device according to claim 3, wherein the fluorescent light body layer includes a ceramic fluorescent light body.

8. The light source device according to claim 1, wherein the multiplexer includes a dichroic film.

9. The light source device according to claim 1, wherein
the first light source and the second light source respectively include a plurality of first light-emitting elements and a plurality of second light-emitting elements, and
in the light source section, the plurality of first light-emitting elements and the plurality of second light-emitting elements are disposed to locate a center of XY coordinates of the plurality of second light-emitting elements at (0, 0).

10. The light source device according to claim 1, wherein the first wavelength range includes a blue wavelength range.

11. The light source device according to claim 1, wherein the second wavelength range includes a red wavelength range.

12. The light source device according to claim 1, wherein the multiplexer is disposed between the wavelength converter and the light condenser.

13. A light source device, comprising:
a light source section including a first light source outputting light in a first wavelength range and a second light source outputting light in a second wavelength range in a same direction as the light in the first wavelength range, the second wavelength range being different from the first wavelength range;
a wavelength converter that is excited by the light in the first wavelength range to output fluorescent light;
a light condenser that concentrates the light in the first wavelength range and the light in the second wavelength range on the wavelength converter; and
a multiplexer that has wavelength selectivity in which the light in the first wavelength range is transmitted and at least a portion of the light in the second wavelength range is reflected or transmitted in accordance with incident angles of the light in the first wavelength range, and the light in the second wavelength range, and combines the light in the first wavelength range, the light in the second wavelength range, and the fluorescent light,
wherein at least a portion of the light in the second wavelength range within a first range of incident angles is transmitted by the multiplexer,
wherein the multiplexer reflects a light component in the second wavelength range included in the fluorescent light, and
wherein an incident angle of the light component in the second wavelength range that is reflected by the multiplexer is outside of the first range of incident angles.

14. The light source device according to claim 13, wherein the light in the first wavelength range, the light in the second wavelength range, and the fluorescent light are combined on a same axis.

15. The light source device according to claim 13, wherein the wavelength converter includes a supporting substrate and a fluorescent light body layer, the supporting substrate being rotatable around a rotating axis, and the light fluorescent light body layer including a plurality of fluorescent light body particles on the supporting substrate.

16. The light source device according to claim 13, wherein the multiplexer is disposed between the wavelength converter and the light condenser.

17. The light source device according to claim 13, wherein the multiplexer includes a dichroic film.

18. The light source device according to claim 13, wherein
the first light source and the second light source respectively include a plurality of first light-emitting elements and a plurality of second light-emitting elements, and
in the light source section, the plurality of first light-emitting elements and the plurality of second light-emitting elements are disposed to locate a center of XY coordinates of the plurality of second light-emitting elements at (0, 0).

19. A light source device, comprising:
a light source section including a first light source outputting light in a first wavelength range and a second light source outputting light in a second wavelength range in a same direction as the light in the first wavelength range, the second wavelength range being different from the first wavelength range;
a wavelength converter that is excited by the light in the first wavelength range to output fluorescent light;
a light condenser that concentrates the light in the first wavelength range and the light in the second wavelength range on the wavelength converter; and
a multiplexer that has wavelength selectivity in which the light in the first wavelength range is transmitted and at least a portion of the light in the second wavelength range is reflected or transmitted in accordance with incident angles of the light in the first wavelength range and the light in the second wavelength range, and combines the light in the first wavelength range, the light in the second wavelength range, and the fluorescent light, wherein the multiplexer is disposed between the wavelength converter and the light condenser.

20. A projection-type display, comprising:
a light source device;
an optical modulator that modulates light outputted from the light source device; and
a projection optical system that projects the light from the optical modulator, the light source device including:
a light source section including a first light source outputting light in a first wavelength range and a second light source outputting light in a second wavelength range in a same direction as the light in the first wavelength range, the second wavelength range being different from the first wavelength range;
a wavelength converter that is excited by the light in the first wavelength range to output fluorescent light;
a light condenser that concentrates the light in the first wavelength range and the light in the second wavelength range on the wavelength converter; and
a multiplexer that has wavelength selectivity in which the light in the first wavelength range is transmitted and at least a portion of the light in the second wavelength range is reflected or transmitted in accordance with incident angles of the light in the first wavelength range and the light in the second wavelength range, and combines the light in the first wavelength range, the light in the second wavelength range, and the fluorescent light, wherein the multiplexer is disposed between the wavelength converter and the light condenser.

* * * * *